(12) United States Patent
Hahn

(10) Patent No.: US 11,945,145 B2
(45) Date of Patent: Apr. 2, 2024

(54) METHOD FOR PRODUCING A COMPONENT

(71) Applicant: LEONHARD KURZ Stiftung & Co. KG, Fürth (DE)

(72) Inventor: Martin Hahn, Herrieden (DE)

(73) Assignee: LEONHARD KURZ Stiftung & Co. KG, Fürth (DE)

( * ) Notice: Subject to any disclaimer, the term of this patent is extended or adjusted under 35 U.S.C. 154(b) by 164 days.

(21) Appl. No.: 17/439,195

(22) PCT Filed: Mar. 9, 2020

(86) PCT No.: PCT/EP2020/056226
§ 371 (c)(1),
(2) Date: Sep. 14, 2021

(87) PCT Pub. No.: WO2020/182736
PCT Pub. Date: Sep. 17, 2020

(65) Prior Publication Data
US 2022/0152893 A1 May 19, 2022

(30) Foreign Application Priority Data
Mar. 14, 2019 (DE) .................... 10 2019 106 561.5

(51) Int. Cl.
*B29C 45/16* (2006.01)
*B29C 45/04* (2006.01)
(Continued)

(52) U.S. Cl.
CPC .......... *B29C 45/1615* (2013.01); *B29C 45/04* (2013.01); *B29C 45/14336* (2013.01);
(Continued)

(58) Field of Classification Search
CPC ............ B29C 45/1615; B29C 45/1628; B29C 45/1671; B29C 45/1679; B29C 2045/1673
See application file for complete search history.

(56) References Cited

U.S. PATENT DOCUMENTS 3,363,039 A * 1/1968 Nagai ..................... B29C 45/16
425/441
4,885,121 A * 12/1989 Patel ...................... B62D 25/24
425/134
(Continued)

FOREIGN PATENT DOCUMENTS

CH          700688 A2    9/2010
CN       101405120 A     4/2009
(Continued)

OTHER PUBLICATIONS

Chinese Office Action dated Apr. 27, 2023.
(Continued)

*Primary Examiner* — Edmund H Lee
(74) *Attorney, Agent, or Firm* — Hoffmann & Baron, LLP

(57) ABSTRACT

A method for producing a component, wherein in the method the following steps are carried out, in particular in the following sequence: providing at least one upper mold carrier and at least one lower mold carrier, wherein the at least one upper mold carrier has at least two upper mold modules and the at least one lower mold carrier has at least one lower mold module; moving the at least one upper mold carrier and/or the at least one lower mold carrier in at least one direction into at least one predetermined position; combining a first upper mold module of the at least two upper mold modules of the at least one upper mold carrier and a first lower mold module of the at least one first lower mold module of the at least one lower mold carrier in the at least one predetermined position such that one or more work
(Continued)

stations for carrying out at least one step for producing the component are formed; carrying out the at least one production step to form the component, as well as a device for producing a component.

17 Claims, 7 Drawing Sheets

(51) Int. Cl.
  *B29C 45/14* (2006.01)
  *B29K 75/00* (2006.01)
  *B29L 31/34* (2006.01)
(52) U.S. Cl.
  CPC .... *B29C 45/14688* (2013.01); *B29C 45/1679* (2013.01); *B29K 2075/02* (2013.01); *B29L 2031/3481* (2013.01)

(56) References Cited

U.S. PATENT DOCUMENTS

| | | | | |
|---|---|---|---|---|
| 5,413,743 | A * | 5/1995 | Prophet | B29C 70/845 264/297.3 |
| 5,756,013 | A * | 5/1998 | Yanagihara | B29C 45/1615 264/297.3 |
| 6,468,458 | B1 * | 10/2002 | Anderson | B29C 45/16 264/328.8 |
| 6,875,301 | B2 * | 4/2005 | Kauppi | B29C 45/1671 264/254 |
| 7,875,224 | B2 | 1/2011 | Gruber | |
| 7,976,757 | B2 * | 7/2011 | Yang | B29C 45/062 264/297.6 |
| 8,124,156 | B2 * | 2/2012 | Axelrod | A23K 50/40 426/515 |
| 8,512,616 | B2 | 8/2013 | Kaufmann | |
| 9,090,009 | B2 | 7/2015 | Deckert et al. | |
| 10,688,699 | B2 | 6/2020 | Oono et al. | |
| 2007/0184273 | A1 | 8/2007 | MacDonald et al. | |
| 2007/0269671 | A1 | 11/2007 | Hirschfelder et al. | |
| 2007/0278713 | A1 | 12/2007 | Suter et al. | |
| 2008/0095992 | A1 | 4/2008 | Hirschfelder et al. | |
| 2014/0332991 | A1 | 11/2014 | Giessauf et al. | |
| 2015/0076735 | A1 | 3/2015 | Moyer, II | |
| 2018/0215190 | A1 | 8/2018 | Reuther | |
| 2019/0084285 | A1 | 3/2019 | Weissenberger | |

FOREIGN PATENT DOCUMENTS

| | | |
|---|---|---|
| CN | 101898401 A | 12/2010 |
| CN | 104149264 A | 11/2014 |
| CN | 107303735 A | 10/2017 |
| CN | 107735256 A | 2/2018 |
| CN | 107921742 A | 4/2018 |
| DE | 102004041833 A1 | 3/2006 |
| DE | 102006019007 B3 | 6/2007 |
| DE | 102010019625 A1 | 12/2010 |
| DE | 102010020039 A1 | 11/2011 |
| DE | 102011014686 A1 | 5/2012 |
| DE | 102011102722 A1 | 11/2012 |
| DE | 102014011135 A1 | 1/2016 |
| DE | 102018002736 A1 | 10/2018 |
| EP | 16555122 | 5/2006 |
| EP | 1977875 A1 | 10/2008 |
| EP | 2540471 A2 | 1/2013 |
| TW | 201521994 A | 6/2015 |
| WO | WO 2006/021200 A1 | 3/2006 |

OTHER PUBLICATIONS

DIN EN ISO 4624:Aug. 2016, "Paints and varnishes—Pull-off test for adhesion", ISO 4624:2016 (Aug. 2016).
Taiwanese Office Action dated Aug. 4, 2023.

* cited by examiner

METHOD FOR PRODUCING A COMPONENT

This application is a National Stage application based on an International Application filed under the Patent Cooperation Treaty, PCT/EP2020/056226, filed Mar. 9, 2020, which claims priority to DE 102019106561.5, filed Mar. 14, 2019.

BACKGROUND OF THE INVENTION

The invention relates to a method for producing a component, as well as a device for producing a component.

It is known to produce plastic components by means of injection molding in an injection-molding device. Such plastic components are used, for example, in automobile manufacture for automobile interior parts such as door trims, trims in instrument panels and center console covers, in the consumer electronics field for decorative trims on television sets or in the telecommunications field for shells of portable devices such as mobile telephones or in the security field.

The production of such plastic components by means of a production method known as "in-mold decoration" is described, for example, in document DE 10 2010 020 039 A1. Here, a transfer film is used to produce a plastic component. This transfer film is guided through an injection mold from the top to the bottom and the film is clamped between mold halves when the mold is closed. When the molten material is injected, the transfer film is pressed against the wall of a cavity by the pressure of the molten material. After cooling, the polyester carrier film of the transfer film is then peeled off the component decorated with the transfer ply of the transfer film.

However, the sensitivity of the plastic component decorated in such a way with regard to the further transport and the further processing of this plastic component is disadvantageous here.

Although it is known to provide plastic components with a protective layer in order to protect these plastic components against external influences, this takes place in flooding devices which are often a long way away from the injection-molding device. In order to provide the plastic components produced in the injection-molding device with a protective layer, they must be transported in packaging, which protects the sensitive surface of the plastic components, from the injection-molding device to a flooding device, in order to provide them with a protective layer there. Here, the complex packaging, which as a rule is not ecological, is associated with a large expenditure in terms of costs and time.

SUMMARY OF THE INVENTION

The object of the present invention is thus to specify an improved method for producing a component, as well as an improved device for producing a component.

In the following, preferably "upper" and "lower", in particular "left" and "right" or vice versa, preferably "back" and "front" or vice versa, and/or other arrangements, are preferably understood in the sense of "a first side" and "a second side" of two, in particular opposite, positions. It is also or further possible that by "upper" and "lower" is meant in particular "left" and "right" or vice versa and/or "back" and "front" or vice versa.

The object is achieved by a method for producing a component, wherein in the method the following steps are carried out, in particular in the following sequence:
providing at least one upper mold carrier and at least one lower mold carrier, wherein the at least one upper mold carrier has at least two upper mold modules and the at least one lower mold carrier has at least one lower mold module,
moving the at least one upper mold carrier and/or the at least one lower mold carrier in at least one direction into at least one predetermined position,
combining a first upper mold module of the at least two upper mold modules of the at least one upper mold carrier and a first lower mold module of the at least one first lower mold module of the at least one lower mold carrier in the at least one predetermined position such that one or more work stations for carrying out at least one step for producing the component are formed,
carrying out the at least one production step to form the component.

This object is further achieved by a device for producing a component, in particular for the implementation according to the above-described method, wherein the device has at least one upper mold carrier and at least one lower mold carrier. The at least one upper mold carrier has at least two upper mold modules and the at least one lower mold carrier has at least one lower mold module. The at least one upper mold carrier and/or the at least one lower mold carrier can be moved in at least one direction into at least one predetermined position. A first upper mold module of the at least two upper mold modules of the at least one upper mold carrier and a first lower mold module of the at least one lower mold module of the at least one lower mold carrier can be combined in the at least one predetermined position such that one or more work stations, in particular for carrying out at least one step for producing the component, are formed.

Studies have shown that it is possible to move the upper mold carrier with a first upper mold module of a first work station in the device such that a second upper mold module can be combined with a first lower mold module in order to form a second work station. Here, a component produced in the first work station in a first production step can remain in the first lower mold module. Thus, the first work station can be formed, for example, as an injection-molding station and the second work station can be formed as a flooding station. Here, the part produced in the injection-molding station remains, for example, in the first lower mold module, while the first work station is dismantled by moving the upper mold carrier with the first upper mold module and the second upper mold module is combined such that the second work station is formed. The efficiency, and thus the cost-effectiveness, of the work stations is hereby significantly increased and ideally doubled.

Through the invention, it is now possible to protect the environment and to lower the process costs:

Studies have shown that the part produced in the first work station need not be removed from the device and as a result need not be transported to a further device. Here, the economically and ecologically disadvantageous packaging of the parts for the transport to the further device is also dispensed with.

Preferably, at least one upper mold carrier of the at least one upper mold carrier can be moved relative to at least one lower mold carrier of the at least one lower mold carrier.

By "move" is here preferably meant a change in a position and/or an alignment of at least one element, preferably along at least one direction in space, in particular relative to a predetermined frame of reference, and/or relative to a position and/or alignment of at least one further element, preferably along at least one further direction and/or the at least one direction, in particular wherein the at least one element and/or the at least one further element are selected and/or combined from: upper mold carrier, lower mold carrier, upper mold module, lower mold module. For example, the element or the elements can be translationally shifted and/or rotationally rotated, in particular about a point and/or axes or several points and/or axes in space.

The at least one upper and/or lower mold carrier can be, for example, a concrete base, in particular a reinforced-concrete base, a metal construction, a crane, one or more robot arms and/or a combination of these.

Advantageous embodiments of the invention are described in the dependent claims.

It is possible for the first upper mold module of the at least two upper mold modules of the at least one upper mold carrier and the at least one first lower mold module of the at least one lower mold module of the at least one lower mold carrier to be combined in the at least one predetermined position such that one or more work stations of the one or more work stations are formed as an injection-molding station comprising an injection mold, wherein the injection mold has the first upper mold module and the first lower mold module, in particular wherein the first upper mold module has a first upper mold half, preferably with at least one first upper mold cavity, and/or the first lower mold module has a first lower mold half with at least one first lower mold cavity.

Further, it is possible for the method to comprise one or more steps of the following steps, in particular in the following sequence:

a) closing the injection mold comprising the first upper mold half, preferably with the at least one first upper mold cavity, and the first lower mold half with the at least one first lower mold cavity, wherein at least one first injection-molding cavity defined by the first upper mold cavity and the first lower mold cavity is formed, b) injection molding at least one base body by introducing a first plastic material into the at least one first injection-molding cavity, c) opening the injection mold, wherein the at least one base body remains following the contours in the at least one first lower or first upper mold cavity and only at least one first partial area of one or more surfaces of the at least one base body is exposed, wherein, however, at least one second partial area of the surface of the base body still remains in the first upper and/or lower mold cavity, d) removing the component comprising the at least one base body from the first upper and/or lower mold cavity or mold half.

Further, it is possible for the following further step to be carried out one or more times before step a) and/or d):

a1) inserting one or more insert elements in the at least one first injection-molding cavity and/or on at least one exposed first partial area of the at least one exposed first partial area of the surface of the at least one base body, wherein the at least one base body remains following the contours in the at least one first upper or first lower mold cavity of the first upper or first lower mold half.

By "inserting" and/or "insert" is here preferably meant inserting individual elements, such as for example sheets, leaves, labels or the like, and/or supplying endless elements, such as webs, strips, threads or the like.

The base body preferably comprises one or more or all insert elements of the one or more insert elements in step d).

The following further step is preferably carried out one or more times after step d), in particular between steps a) and b) and/or b) and c):

e) applying at least one first cover layer made of a second plastic material, in particular by means of injection molding and/or flooding and/or partial overspraying, to at least one partial area of the surface of the at least one base body.

It is advantageous here to apply the first cover layer such that the one or more insert elements are encased between the at least one base body and the at least one first cover layer. This encasing makes it possible to protect the insert elements correspondingly well from environmental influences or to achieve particularly advantageous optical and/or functional effects through the interactions brought about hereby.

When step e) is carried out, it is also possible for the at least one base body to remain following the contours in the first upper or first lower mold cavity of the first upper or first lower mold half.

Further, when step e) is carried out, it is also possible for at least one second injection-molding cavity by means of one or more further upper mold halves of the at least two upper mold modules of the at least one upper mold carrier and/or one or more further lower mold halves of the at least one lower mold module of the at least one lower mold carrier, in particular by sealing the one or more further upper and/or lower further mold halves against the at least one base body, the one or more insert elements and/or the first upper and/or lower further mold half, and for the second plastic material to be introduced into the at least one second injection-molding cavity.

In particular, the following step is carried out one or more times between steps b), c) and/or d) and/or between steps d) and e):

pretreating at least one exposed first partial area of the at least one exposed first partial area of the surface of the at least one base body, in particular using one or more processing methods and/or combinations of one or more processing methods selected from: treatment with gas, flame treatment, plasma treatment, fluorination, irradiation, cleaning, surface activation, coating.

It is possible for at least one optical check of at least one partial area of the surface of the at least one base body, of the one or more insert elements, and/or of the component to be effected by means of one optical sensor or several optical sensors, in particular one or more cameras, between steps c), d) and/or e).

It is also possible for the following step to be carried out after step c) or d) and/or between steps d) and e) and/or after step e):

cleaning, in particular by means of brushes and/or compressed air and/or suction.

Further, it is possible for one or more insert elements of the one or more insert elements to be used in step a1) as a transfer film, in particular a cold-stamping film, comprising a carrier ply and a transfer ply detachable therefrom, for an adhesive layer to be applied, in particular by means of an inkjet printhead, to the transfer ply and/or to at least one partial area of the surface of the at least one base body in at least one first area, but not to be applied in at least one second area, for the transfer film to be guided by means of the stamping tool towards the one or more surfaces of the at least one base body, for the adhesive layer to be activated and for the transfer film then to be peeled off the transfer ply adhering to the base body, with the result that a section of the transfer ply defined by the shape of the first area are applied as the one or more insert elements.

Further, it is possible for one or more insert elements of the one or more insert elements to be used in step a1) as a transfer film, in particular a hot-stamping film, preferably comprising a carrier ply and/or a transfer ply detachable therefrom with an adhesive layer, in particular wherein the transfer film is pressed against the one or more surfaces of the at least one base body by means of a heated stamping tool, in particular wherein the adhesive layer and the detachment layer of the transfer film are activated and in particular wherein the transfer film is then peeled off the transfer ply adhering to the base body, in particular wherein a section of the transfer ply defined by the shape of the stamping tool are hereby applied as the one or more insert elements.

Further, it is also possible for one or more steps of the following further steps and/or for at least one combination of one or more steps of the following one or more steps to be carried out, in particular selected from: printing, in particular inkjet printing and/or pad printing, labeling, in particular sticking on labels, introducing and/or applying laser markings, lasering, in particular ablation, or material removal, and/or blackening and/or color change, preferably of laser-sensitive layers or areas of the component and/or the base body, cold stamping, hot stamping, thermal transfer, preferably wherein these steps are arranged in particular before and/or after the removal of the component and/or the at least one base body and/or the component comprising the at least one base body from the mold, preferably before and/or after step d), further preferably before and/or after the demolding station, and/or in particular before and/or after the flooding, preferably before and/or after step e).

During the stamping of one or more insert elements of the one or more insert elements, in particular if a hot-stamping film is used, preferably a section of a transfer ply defined by the shape of the stamping tool is preferably applied as insert element by activating an adhesive layer of the transfer ply or an adhesive layer provided between the base body and the transfer ply.

Further, it is advantageous, in particular if a cold-stamping film is used, to apply an adhesive layer to the carrier ply and/or to a partial area of the surface of the base body in a third area, but not to apply one in a fourth area, to guide the transfer film towards the surface of the base body by means of a stamping tool, to activate the adhesive layer and to peel the transfer film off again, in particular wherein a section of the transfer ply defined by the shape of the third area is applied to the base body as insert element. The application of the adhesive layer here is preferably effected by means of a digital printing method, in particular by means of an inkjet printhead.

Further, it is possible for further steps to be effected after removing or after the removal of the component and/or the at least one base body and/or the component comprising the at least one base body from the mold, wherein one or more of the further steps are preferably selected from: fitting with functional elements, in particular fitting with printed circuit boards and/or electronic components and/or mechanical components and/or fastening elements, coating, in particular coating with adhesive and/or with further, preferably different, functional layers, mounting and/or installing on and/or in further, in particular different, bodies and/or base bodies, preferably bodies of all types.

Before step a) one or more further insert elements are preferably introduced into the at least one first injection-molding cavity, in particular are inserted in the first upper and/or first lower mold half, and in step b) are back-injection molded and/or insert-molded with the first plastic material.

When step a1) is carried out, one or more insert elements of the one or more insert elements are preferably inserted register-accurate relative to one or more further insert elements of the one or more further insert elements and/or register-accurate relative to the contour of the first upper and/or first lower mold cavity, in particular wherein one or more register marks or optical features of the one or more further insert elements and/or of the first upper and/or first lower mold cavities or mold halves are detected and are used to control the insertion.

By register or registration, or register accuracy or register precision or registration accuracy, or positional accuracy, is meant in particular a positional accuracy of two or more elements and/or layers relative to each other. The register accuracy is preferably to range within a predefined tolerance and is preferably to be as high as possible. At the same time, the register accuracy of several elements and/or layers relative to each other is in particular an important feature in order to increase the process reliability. The positionally accurate positioning is effected in particular by means of sensorial, preferably optically detectable, registration marks or the position markings. In particular, these registration marks or position markings either represent specific separate elements or areas or layers or are themselves part of the elements or areas or layers to be positioned.

Preferably, one or more insert elements of the one or more insert elements and/or one or more further insert elements of the one or more further insert elements are a laminating film preferably formed over part of the surface, for example as a "label", or a so-called "insert" as a pre-molded partial element provided in particular with decorative and/or functional elements, and/or an insert part in particular as a functional reinforcing or stiffening element made of metal and/or plastic and/or fiber composite and/or plastic with fiber components, and/or a transfer film.

It is possible for one or more insert elements of the one or more insert elements and/or one or more further insert elements of the one or more further insert elements to be introduced into the at least one first injection-molding cavity before step a) is carried out, before the injection mold is closed. For this, here, the one or more insert elements of the one or more insert elements and/or the one or more further insert elements of the one or more further insert elements are inserted in particular in the first lower and/or first upper mold half, preferably as individual elements, and/or supplied in the form of a film web.

Further, it is possible for a first group of one or more insert elements of the one or more insert elements and/or one or more further insert elements of the one or more further insert elements to be inserted in at least one upper mold half and/or mold cavity of the at least one upper mold half and/or mold cavity, in particular of the first upper mold half and/or of the first upper mold cavity, and/or for a second group of one or more insert elements of the one or more insert elements and/or one or more further insert elements of the one or more further insert elements to be inserted in at least one lower mold half and/or mold cavity of the at least one lower mold half and/or mold cavity, in particular of the first lower mold half and/or of the first lower mold cavity.

It is hereby possible to achieve a decoration of the at least one base body and/or the component "on both sides" or a provision of the component with the desired functional layers on both sides. Thus, for example, the underside of the at least one base body and/or the component is formed by the one or more insert elements and/or further insert elements of the first group of insert elements and/or further insert elements, and on the upper side of the at least one base body and/or the component the one or more insert elements and/or further insert elements of the second group of insert elements and/or further insert elements form the upper side of the at least one base body and/or the component.

The component and/or the at least one base body can preferably formed opaque or translucent or transparent, in particular in order to provide different optical appearances of the component.

By "opaque" is preferably meant a transparence, in particular in the wavelength range visible to humans, of less than 50%, in particular of less than 20%, preferably less than 5%.

By "transparent" is preferably meant a transparence, in particular in the wavelength range visible to humans, of at least 50%, in particular of more than 50%, preferably of more than 75%.

If the component and/or the at least one base body is formed transparent for example, the decoration on both sides can, together, generate an optical depth effect through the spacing of the two decorations due to the wall thickness of the component and/or the at least one base body. For this, the thickness of the at least one base body is preferably chosen such that the one or more insert elements and/or further insert elements of the first group of insert elements and/or further insert elements on the one hand and the one or more insert elements and/or further insert elements of the second group of insert elements and/or further insert elements on the other hand are spaced apart from each other such that an optical depth effect is generated by the interaction of the one or more insert elements and/or further insert elements of the first and/or second group of insert elements and/or further insert elements.

If the component and/or the at least one base body is formed opaque for example, the decoration on both sides can provide a different optical appearance of the component and/or the at least one base body from different sides through the one or more insert elements and/or further insert elements of the first group of insert elements and/or further insert elements and/or through the one or more insert elements and/or further insert elements of the second group of insert elements and/or further insert elements, or vice versa.

Through the use of one or more insert elements and/or further insert elements of the first group of insert elements and/or further insert elements and/or of one or more insert elements and/or further insert elements of the second group of insert elements and/or further insert elements, a combination of decorative films and functional films is in particular also effected, or vice versa. For example, a decoration can be effected on one side of the component and/or the at least one base body and an application of a functional element, for example a touch sensor and/or strip conductors and/or an antenna and/or a display, can be effected on the other side of the component and/or the at least one base body.

The production process is preferably designed such that one or more first insert elements of the one or more insert elements and/or one or more first further insert elements of the one or more further insert elements which are preferably more resistant to pressure and/or heat are used as one or more second insert elements of the one or more insert elements and/or one or more second further insert elements of the one or more further insert elements, or vice versa, and the insert elements and/or further insert elements which are in particular less resistant to pressure and/or heat are used as the one or more second insert elements and/or second further insert elements, or vice versa. In this variant, it is possible for one or more third insert elements of the one or more insert elements and/or one or more third further insert elements of the one or more further insert elements to be applied to the component and/or the at least one base body as one or more functional elements and for one or more fourth insert elements of the one or more insert elements and/or one or more fourth further insert elements of the one or more further insert elements to be applied to the component as one or more decorative elements, or vice versa.

Preferably, the production process here is alternatively also designed such that one or more fifth insert elements of the one or more insert elements and/or one or more fifth further insert elements of the one or more further insert elements are applied to the component and/or the at least one base body as one or more functional elements and one or more sixth insert elements of the one or more insert elements and/or one or more sixth further insert elements of the one or more further insert elements are applied to the component and/or the at least one base body as one or more decorative elements, or vice versa.

It is possible for the first, second, third, fourth, fifth and/or sixth insert elements and/or further insert elements and/or the first and/or the second group of insert elements and/or further insert elements to be identical to or different from each other.

Particularly advantageously, it is possible here for the one or more first, second, third, fourth, fifth and/or sixth insert elements and/or further insert elements and/or the first and/or the second group of insert elements and/or further insert elements preferably to be arranged particularly register-accurate relative to each other through the method. This is because, both in the back-injection molding of the first, second, third, fourth, fifth and/or sixth insert elements and/or further insert elements and/or the first and/or the second group of insert elements and/or further insert elements and in the flooding and/or stamping of the first, second, third, fourth, fifth and/or sixth insert elements and/or further insert elements, the at least one base body and/or the component is defined by the at least one upper and/or lower mold cavity of the at least one upper and/or lower mold half, in particular by the first upper and/or lower mold cavity of the first upper and/or lower mold half, and thus no further registration step has to be effected any more in this respect.

In particular, the following step is carried out between steps d) and e) or after step e):

f) applying at least one second cover layer to at least one partial area of the surface of the at least one base body.

In particular, the at least one second cover layer consists of a third plastic material.

Further, in particular when step f) is carried out, preferably when the one or more insert elements are inserted, one or more insert elements of the one or more insert elements are preferably inserted and/or flooded register-accurate relative to one or more further insert elements of the one or more further insert elements. For this, it is advantageous to detect one or more register marks and/or optical features of the one or more further insert elements and/or of the first upper and/or lower mold half and/or of the first upper and/or lower mold cavity and to use these to control the insertion and/or flooding. In addition, corresponding register marks and/or optical features of the insert elements and/or further insert elements can be detected, which are used in the insertion and/or flooding of the one or more insert elements and/or further insert elements, as set out above.

In particular, one or more insert elements of the one or more insert elements and/or one or more further insert elements of the one or more further insert elements are back-injection molded and/or sprayed and/or insert-molded with the first, second and/or third plastic material, preferably in step b).

Further, it is possible for the one or more insert elements and/or the one or more further insert elements in each case to have at least one decorative layer and/or at least one functional layer, in particular a layer with an electrical functionality, in particular comprising one or more elements selected from touch sensor, antenna, capacitor, coil, electromagnetic shielding, electrically non-conductive, metallic layers, in particular for preventing electrostatic charge, display, LED, electric circuit, solar cell, at least one, in particular post-curable, protective layer and/or at least one barrier layer and/or at least one adhesion-promoting layer or adhesion-promoter layer.

At least one decorative layer of the at least one decorative layer here preferably consists of one or more or a combination of one or more decorative layers of the following decorative layers:

transparent or translucent or opaque varnish layer containing dyes and/or pigments, in particular organic/inorganic pigments, luminescent and/or fluorescent pigments and/or dyes, optically variable pigments, thermochromic pigments and/or dyes, metallic pigments, magnetically alignable pigments,
  volume hologram layer,
  layer with optically active surface relief, in particular a diffractive and/or refractively acting surface relief, a holographic surface relief, a surface relief containing refractive structures, diffractive structures, in particular lens structures, microlens arrangements, microprisms, micromirrors, matte structures, in particular isotropic and/or anisotropic matte structures and/or a combination of any such structures;
  reflective layers, in particular metallic or dielectric reflective layers;
  high-refractive-index or low-refractive-index layers, in particular with refractive indices which differ from a refractive index of 1.5 by more than +/−0.2;
  liquid crystal layers, in particular cholesteric and/or nematic liquid crystal layers;
  thin-film layers, which display an optically variable color-change effect, in particular comprising an absorber layer, a dielectric spacer layer and an optional reflective layer or alternatively comprising a multiple sequence of alternating high-refractive-index and low-refractive-index transparent layers.

It is possible for these decorative layers here to be applied to each other and/or next to each other in any sequence. In particular, each individual decorative layer is here formed patterned over part of the surface, in order preferably to achieve a desired graphic decoration. The decorative layers are preferably arranged registered relative to each other.

At least one functional layer of the at least one functional layer preferably consists of one or more or a combination of one or more functional layers of the functional layers listed below:

layers with an electrical functionality, in particular comprising one or more elements selected from: touch sensor, antenna, electromagnetic shielding, electrically non-conductive, metallic layers for preventing electrostatic charge, display, LED (LED=light emitting diode), electric circuit, solar cell, layer with a magnetic functionality, for example a magnetic barcode, layers with mechanical functionality, for example reinforcing elements or stiffening elements made of metal and/or plastic and/or woven and/or non-woven fiber plies and/or fibrous additives and/or fibrous additional layers, layers with optical functionality, for example anti-reflection layers or reflective layers, layers with tactile functionality, for example soft-touch surface coatings.

It is further also possible for the first upper and/or first lower mold half to be rotated and/or shifted and/or moved between steps a1) and b), steps a) and b) and/or steps d) and e) being carried out.

A second upper mold module of the at least two upper mold modules of the at least one upper mold carrier and the first lower mold module of the at least one lower mold module of the at least one second mold carrier are preferably combined in the at least one predetermined position such that one or more work stations of the one or more work stations are formed as a flooding station comprising the second upper mold module and the first lower mold module, in particular wherein the second upper mold module is a first upper flooding half and/or the first lower mold module is the second mold half with the second mold cavity.

It is particularly advantageous here to apply the at least one second cover layer such that the one or more insert elements are encased between the at least one base body and the at least one second cover layer. This encasing makes it possible to protect the insert elements correspondingly well from environmental influences or to achieve particularly advantageous optical and/or functional effects through the interactions brought about hereby.

In particular, it is possible for the at least one first cover layer to be applied, preferably according to step e), to at least one partial area of the surface of the at least one base body, but for a second cover layer not to be applied, preferably according to step f), to the at least one partial area of the surface of the at least one base body, or vice versa.

Preferably, the at least one first cover layer is applied, preferably according to step e), to one or more first partial areas of the surface of the at least one base body and the at least one second cover layer is applied, preferably according to step f), to one or more second partial areas of the surface of the at least one base body, in particular wherein the at least one first cover layer in the first partial areas and the at least one second cover layer in the second partial areas are arranged registered relative to each other.

Further, it is possible for the at least one first cover layer and the at least one second cover layer in the first partial areas and second partial areas, respectively, to have different properties, in particular wherein one or more of the properties or combinations of one or more properties are selected from: color, pattern, motif, relief structure, in particular diffractively acting relief structure, optical elements, in particular optically variable elements, gloss levels.

It is possible for the at least one second cover layer to be applied by means of the flooding station in step f) such that one or more insert elements of the one or more insert elements are at least partially encased between the at least one base body and the at least one second cover layer, in particular wherein the at least one second cover layer is applied by means of the flooding station in step f) such that the at least one second cover layer overlaps the one or more insert elements and/or the at least one first partial area of the surface of the base body only over part of the surface or completely.

In all of these steps, the at least one base body preferably remains following the contours in the first lower mold cavity of the first lower mold half. For one thing, a correspondingly high injection-molding and flooding quality is hereby also ensured for the further injection-molding and/or flooding steps and, for another, a particularly good registration of the one or more insert elements applied and/or of the one or more further insert elements, as well as of the at least one first and/or second cover layer, is also achieved. As a result, the registration of the insert elements and/or further insert elements and/or first and/or second cover layers applied and thus the product quality are further considerably improved and waste is correspondingly reduced.

Further, it is possible for the at least one first and/or second cover layer to be applied such that the at least one first and/or second cover layer overlaps the one or more insert elements and/or the at least one, in particular first and/or second, partial area of the surface of the at least one base body only over part of the surface. This overlapping over part of the surface can moreover also be effected registered relative to the one or more insert elements and/or the at least one, in particular first and/or second, partial areas of the surface of the at least one base body, in order thus to create, correspondingly registered, through the at least one first and/or second cover layers, functional and/or decorative elements which correspondingly interact with and/or supplement decorative elements and/or functions of the one or more insert elements.

It is further also possible for the at least one first and/or second cover layer to be applied such that the at least one first and/or second cover layer completely overlaps the one or more insert elements and/or the at least one, in particular first and/or second, partial area of the surface of the at least one base body. For example, at least one correspondingly closed protective layer or decorative layer can hereby be created in the corresponding at least one, in particular first and/or second, partial areas of the surface of the at least one base body and/or the component which is, for example, to form the outside at least one base body and/or of the component exposed to atmospheric conditions.

Further, it is possible, before and/or during and/or after the application of the at least one second cover layer in step c), in particular by means of the flooding station, for the at least one second cover layer to be modified and/or structured, preferably by inserting/placing particles on at least one partial area of the surface of the at least one base body and/or after step b) and/or through the use of mold structures during the application in step f) and/or by subsequent lasering, overprinting and/or overstamping of the at least one second cover layer.

The flooding or dousing of at least one partial area of the surface of the at least one base body and/or the component preferably allows the use of a large number of different solvent-containing, preferably flowable, polyurethane-containing compositions, which can be matched, for example specifically, to the composition of the at least one first, second and/or third plastic material of the at least one base body and/or the component and/or to the properties to be achieved by the at least one first and/or second cover layer, for example in terms of optical properties, mechanical properties and/or chemical resistance.

It is possible for the application of at least one first and/or second cover layer of the at least one first and/or second cover layer to at least one partial area of the surface of the at least one base body and/or the component, in particular after step e) and/or f), preferably wherein the at least one partial area of the surface of the at least one base body and/or the component is not yet completely cured at least in areas and in particular wherein the application of the at least one first and/or second cover layer to the at least one partial area of the surface of the at least one base body and/or the component is effected by at least partial flooding and/or dousing with at least one solvent-containing, preferably flowable, polyurethane-containing composition and subsequent curing, preferably at a temperature from a range of from 25° C. to 180° C. In particular, the at least one solvent-containing, preferably flowable, polyurethane-containing composition has at least one organic solvent, for example ethyl acetate, 2-butanone, acetone, toluene, xylenes or mixtures thereof.

Further, it is possible for the application of at least one first and/or second cover layer of the at least one first and/or second cover layer to at least one partial area of the surface of the at least one base body and/or the component to be effected, in particular after step e) and/or f), wherein the partial area of the surface of the at least one base body and/or the component preferably consists of one or more elements from the group consisting of paper, plastic, wood, composite, glass, metal and combinations thereof.

In particular, it is possible one or more insert elements of the one or more insert elements and/or one or more further insert elements of the one or more insert elements and/or at least one partial area of the surface of the at least one base body is stamped in a further step, which is carried out in particular between one of steps a) to d) or after step d), preferably by means of roll-on stamping, partial roll-on stamping or vertical stamping. Further, it is also possible to use corresponding stamping methods for this.

The stamping of the one or more insert elements and/or one or more further insert elements is preferably carried out with one stamping tool or several stamping tools, which apply a film or one or more sections of a film as insert elements and/or further insert elements to at least one exposed partial area or at least one, in particular first and/or second, preferably exposed, partial area of the at least one, in particular first and/or second, partial area of the surface of the at least one base body. The stamping tools here are preferably stamping dies or stamping rollers, which are in particular optionally also adapted correspondingly to the shape of the at least one base body or make a corresponding following of the contours with respect to the surface contour of the, in particular first and/or second, partial area of the surface of the at least one base body possible in their guiding and in their roll-on behavior, or are adapted thereto. Such stamping dies and stamping rollers preferably have in each case an elastomeric base body or elastomeric layers, for example made of silicone.

In particular transfer films, for example hot-stamping films or cold-stamping films, but also laminating films, come into consideration as insert elements and/or further insert elements when step a1) is carried out.

Transfer films which comprise a carrier ply and a transfer ply detachable therefrom are particularly suitable for use here. The carrier ply here preferably consists of a plastic film, for example a PET film with a thickness of between 10 μm and 250 μm. The transfer ply here has one or more layers which are preferably selected from: one or more decorative layers, one or more functional layers, one or more protective layers, one or more adhesion-promoting layers, one or more barrier layers, one or more conductive layers.

Further, it is advantageous if one or more detachment layers, which improve the detachability, are arranged between the carrier ply and the transfer ply. Such layers preferably contain waxes and/or silicones and/or polymers.

If such a transfer film is designed as a stamping film, it preferably has a thermally activatable adhesive layer, which can in particular be activated by the thermal energy of the stamping tool, on the side of the transfer film facing away from the carrier ply.

Further, it is also possible for the transfer ply of the transfer film further to have, for example, openings introduced by means of punching or cutting or laser exposure or for the transfer ply to be provided in the form of patches on the carrier ply. Such transfer plies further preferably also have another one or more carrier films for stabilizing the transfer ply. This further results in the advantage that "sensitive" functional and decorative layers receive an additional protection from the thermal and mechanical stresses of the stamping process or the subsequent process steps.

Laminating films preferably do not have a "detachable" carrier ply. Laminating films preferably have one or more of the following layers: one or more decorative layers, one or more functional layers, one or more protective layers and/or cover layers, one or more carrier layers, one or more adhesion-promoter layers, one or more carrier films, one or more barrier layers, one or more conductive layers.

The laminating films here preferably have in particular openings introduced by punching and/or cutting and/or laser exposure or are already supplied to the stamping process in the form of released, in particular punched-out, individual elements on a carrier layer during the stamping.

It is also possible for the first, second and/or third plastic material to consist of a thermoplastic material, of a plastic material that cures by crosslinking, in particular a two-component material (2C=two-component), and/or of a thermally curable and/or radiation-curable material, and/or of a mixture of such plastic materials and/or wherein for the first, second and/or third plastic material to be completely or partially cured, in particular by irradiation.

The first, second and/or third plastic material particularly advantageously consists of a two-component plastic, which is mixed in a mixing head when the two components are injected into the at least one first and/or second injection-molding cavity, with the result that a mixture enters the corresponding injection-molding cavities. The reaction of the mixture takes place in the corresponding injection-molding cavities and can also still proceed further after the mold halves have been opened. The use of such materials makes it possible to achieve at least one particularly hard and weather-proof first and/or second cover layer.

Further, it is also possible for the first, second and/or third plastic material to be post-cured or fully cured in a later step or several later steps. Such a post-curing or full curing can be effected for example by means of irradiation, in particular by means of actinic radiation, preferably UV irradiation and/or electron beam curing.

It is particularly advantageous to repeat the step of applying the at least one first and/or second cover layer made of the first, second and/or third plastic material, in particular by overspraying, flooding and injection molding, multiple times. Here, different first, second and/or third plastic materials and/or different third mold halves can further also be used in the successive steps, with the result that corresponding first and/or second cover layers differing with respect to their molding and/or their material are applied to one another. Further, it is also possible here to carry out step a1), inserting the one or more insert elements, in each case additionally another one or more times after the respective application of the first and/or second cover layer. It is thus possible for example, after a first and/or second cover layer has been applied, to carry out step a1) and/or e) and/or f) again, then to apply a further cover layer, optionally in a different molding and/or made of a different material, to it again, to insert one or more insert elements of the one or more insert elements on it again, etc. This makes it possible to realize correspondingly complex decorative and/or functional functions in the component and/or in the at least one base body cost-effectively.

Preferably, the first, second and/or third plastic material consists of polyurethane or polyurea and the first, second and/or third plastic material consists of a thermoplastic, in particular of ABS, ASA, ABS-PC, PC-PBT and/or ASA-PC and/or in that the composition of the first, second and/or third plastic material is selected from the group of polyurethane-containing dispersions, polyurethane-containing resins, polyurethane solutions, compositions comprising polyurethane precursors (2C PUR systems) and mixtures thereof.

It is also possible for the first, second and/or third plastic material preferably to consist of a thermoplastic, in particular of an impact-resistant thermoplastic, of polyethylene (PE), polycarbonate (PC), polypropylene (PP), polystyrene, polybutadiene, polynitriles, polyesters, polyurethanes, polymethacrylates, polyacrylates, polyamides, polyethylene terephthalate (PET), polybutylene terephthalate (PBT), preferably acrylonitrile butadiene styrene (ABS), acrylonitrile styrene acrylate (ASA), ABS-PC, PET-PC, PBT-PC, PC-PBT and/or ASA-PC and/or copolymers or mixtures thereof. In principle, the first, second and/or third plastic material preferably further also contains inorganic or organic fillers, preferably $SiO_2$, $Al_2O_3$, $TiO_2$, clay minerals, silicates, zeolites, glass fibers, carbon fibers, glass beads, organic fibers or mixtures thereof. Here, the fillers are added in particular to the first, second and/or third plastic material in order to further increase the stability of the at least one base body and/or the component. In particular, these fillers reduce the proportion of polymeric materials and hereby lower the production costs and/or the weight of the at least one base body and/or the component.

Further, it is also possible for the first, second and/or third plastic material in particular to be identical or different.

Preferably, the thickness of the at least one first and/or second cover layer is preferably chosen from a range of between 100 µm and 20,000 µm, in particular 100 µm to 10,000 µm, preferably between 200 µm and 5000 µm.

The at least one first and/or second cover layer preferably adheres to the at least one base body and/or the component, in particular to at least one partial area of the at least one base body and/or the component, preferably after curing, with an adhesiveness, determined according to the method described in DIN EN ISO 4624: 2016-08, preferably with a PosiTest® AT Series pull-off adhesion tester from DeFelsko Corporation (Ogdensburg, N.Y., USA) using a 20-mm dolly, from a range of from 2.5 MPa to 5 MPa, in particular from 2.5 MPa to 10 MPa. Here, it is possible that the at least one first and/or second cover layer cannot be detached, after curing, without damage from the at least one base body and/or the component, in particular on at least one partial area of the at least one base body and/or the component.

Further, it is also possible for step e) to be carried out multiple times with different first and/or second and/or third plastic materials and/or different further upper and/or lower mold halves and/or further upper and/or lower mold cavities.

In addition to carrying out the above-described steps, it is further advantageous to carry out one or more of the following steps, also multiple times, during the production of the component and/or the at least one base body:

A pretreatment of at least one partial area, in particular an exposed partial area, of the surface of the at least one base body and/or of the one or more insert elements and/or further insert elements is preferably effected. This pretreatment is thus preferably carried out between steps c) and d) and/or between step d) and the application of the at least one first and/or second cover layer, in particular steps e) and/or f). If still further floodings are carried out and/or a first and/or second cover layer is applied multiple times, as stated above, such a pretreatment is preferably also carried out before these respective steps are carried out.

As pretreatment, one or more of the following processing methods are preferably carried out: surface activation, in particular by treatment with gas, flame treatment, plasma treatment, fluorination, irradiation, cleaning, coating.

It is particularly advantageous here that, because of the "closeness" in time of the pretreatment both to the upstream injection-molding process and to the downstream flooding process, the pretreated surface is particularly "accessible" for the processing methods carried out and—due to the closeness in time—a degeneration is largely avoided. The effectiveness of the pretreatment is thus considerably increased, and for example the adhesion properties between the at least one base body and the one or more insert elements and/or further insert elements and/or the at least one first and/or second cover layer are improved.

An optical check of at least one partial area of the surface of the at least one base body and/or of the one or more insert elements and/or further insert elements and/or of the component is preferably carried out. This is effected in particular by means of an optical sensor, for example a camera, for example comprising a CCD (CCD="charged coupled device") chip and/or a TES (TES="transition edge sensor"): such an optical check is preferably carried out here using image-processing methods and can for example be used to optimize process parameters for example by incorporation into a corresponding control loop, in order thus to further reduce the reject rates. Further, this optical check can also be used for quality assurance. This optical check can take place multiple times at different times in the process, for example after the injection-molding process and/or after the flooding process and/or after the pretreatment and/or after the application of the one or more insert elements and/or further insert elements and/or after the further coating, flooding, overspraying and/or after a cleaning process and/or after the removal of the component from the first upper and/or lower mold cavity and/or from the upper and/or lower mold cavities.

Preferably, a cleaning process is carried out in particular after step a1) and/or e) and/or f) has been carried out, after the application of the one or more insert elements and/or further insert elements or, respectively, the application of at least one first and/or second cover layer, and/or after step e) and/or f) has been carried out, in which the at least one first and/or the second cover layer is applied. Through this process, for example, the exposed surface is cleaned of waste products of the injection-molding and/or flooding process. The cleaning process is preferably carried out here as long as the at least one base body is still located in the first upper and/or lower mold half and/or the first upper and/or lower mold cavity. The at least one base body is hereby securely fixed while the cleaning is being carried out, with the result that cleaning methods which require a stable fixing of the product to be cleaned can also be used.

The cleaning is preferably effected here by means of brushes and/or compressed air and/or suction.

Between steps b) and a1) and/or a1) and e) and/or a1) and f) being carried out, the injection of the at least one base body and the insertion of the one or more insert elements and/or further insert elements, the first mold half is preferably rotated and/or shifted and/or moved in order to make it possible to correspondingly process the exposed surface of the at least one base body, for example using a flooding unit and/or a stamping unit and/or a printing unit and/or a laser unit.

Further, however, it is also possible to leave the upper and/or lower mold halves, in particular the first upper and/or lower mold half, stationary and for example to move at least one insertion unit arranged on a robot arm so that an insertion of the one or more insert elements and/or further insert elements on at least one partial area and/or the exposed surface of the at least one base body is made possible by means of it.

While the further processing steps described above are being carried out, in each case a shifting and/or a rotation of the upper and/or lower mold halves, in particular of the first upper and/or lower mold halves, is preferably also effected such that the at least one base body is preferably processed correspondingly using a work station allocated to the respective processing step.

Preferred embodiments of the device are mentioned below.

It is advantageous that the device comprises several further work stations, between which the upper and/or lower mold halves, in particular the first upper and/or lower mold half, are shifted and/or moved, for example by shifting and/or rotation, in order to process the at least one base body according to the above-described processing steps corresponding to the predefined method sequence.

It is possible that the at least one upper mold carrier having the at least two upper mold modules can be moved in the at least one direction into at least one predetermined position or that the at least one lower mold carrier having the at least one lower mold module can be moved in the at least one direction into at least one predetermined position or that the at least one upper mold carrier and the at least one lower mold carrier can be moved in the at least one direction into the at least one predetermined position.

Further, it is possible for the at least one upper mold carrier having the at least two upper mold modules and/or for the at least one lower mold carrier having the at least one lower mold module to be arranged along a predetermined preferred direction and/or in a predetermined preferred plane, in particular wherein the at least one upper mold carrier and/or the at least one lower mold carrier is or are formed as a preferably vertically or horizontally arranged rotary plate or sliding table.

The movement of the at least one upper and/or lower mold modules or mold halves here is preferably realized by the at least one upper and/or lower mold modules and/or mold halves being arranged movably mounted on the at least one upper and/or lower mold carrier and in particular being securely connected to it. This at least one upper and/or lower mold carrier is preferably a vertically or horizontally arranged rotary plate or sliding table. The at least one upper and/or lower mold module or mold half is preferably fastened to this rotary plate or sliding table. The rotary plate and/or sliding table is further mounted correspondingly movable, that the at least one upper and/or lower mold modules and/or mold halves can be moved between the work stations, in particular between the injection-molding station and the flooding station.

The device here preferably has not only one first upper and/or one first lower mold module or mold half, but two or more upper and/or lower mold modules or mold halves, which are arranged on at least one common upper and/or lower mold carrier of the at least one upper and/or lower mold carrier. It is hereby possible to considerably increase the effectiveness of the production methods, as well as the efficiency of the individual work stations. If for example two upper and/or lower mold halves are arranged on a common upper and/or lower mold carrier of the at least one upper and/or lower mold carrier, then while the flooding is being carried out in the flooding station a new base body can already be injection-molded in parallel in the first injection-molding station, and a doubling of the efficiency can correspondingly be achieved hereby.

It is also possible for at least one upper mold module of the at least two upper mold modules of the at least one upper mold carrier and/or for at least one lower mold module of the at least one lower mold module of the at least one lower mold carrier to be selected from: mold half, in particular mold half comprising a mold cavity, preferably a first mold half with a first mold cavity or a second mold half with a second mold cavity.

One or more work stations of the one or more work stations are preferably selected and/or combined from: injection-molding station, flooding station, pretreating station, flooding station, first further injection-molding station, second further flooding station, cleaning station, demolding station.

In particular, at least one work station of the one or more work stations is formed as an injection-molding station comprising a first upper mold module of the at least two upper mold modules of the at least one upper mold carrier and a first lower mold module of the at least one lower mold module of the at least one lower mold carrier, in particular wherein the first upper mold module is a first upper mold half with a first upper mold cavity and/or the first lower mold module is a first and/or second lower mold half with a first and/or second lower mold cavity.

The at least one injection-molding station preferably has at least one insertion unit, wherein the at least one insertion unit is for inserting one or more insert elements and/or further insert elements in the first upper and/or the first lower mold cavity of the first upper or first lower mold half respectively.

It is also possible for the at least one injection-molding station to have a closing device for closing an injection mold, in particular comprising the first upper mold half with the first upper mold cavity and the first lower mold half with the first lower mold cavity, forming at least one first injection-molding cavity, and for opening the injection mold.

Further, it is also possible for the at least one injection-molding station to have an injection unit for introducing first plastic material forming at least one base body into the at least one first injection-molding cavity and/or to be for applying at least one first cover layer to at least one partial area of the surface of the at least one base body, in particular wherein the at least one first cover layer consists of a second plastic material.

In particular, the at least one base body comprises one or more or all insert elements of the one or more insert elements.

It is possible for the at least one base body to be arranged following the contours in the first upper and/or first lower mold cavity of the first upper or first lower mold half of the first upper or first lower mold modules of the at least one upper or lower mold carrier, respectively, and/or the at least one first injection-molding cavity.

At least one work station of the one or more work stations is preferably formed as a flooding station comprising a second upper mold module of the at least two upper mold modules of the at least one upper mold carrier and the first lower mold module of the at least one lower mold module of the at least one lower mold carrier, in particular wherein the second upper mold module is a first upper flooding half and/or the first lower mold module is the first lower mold half with the first lower mold cavity.

The flooding station and/or the first upper flooding half preferably is or comprises a casting mold or a 2C mold.

It is possible for the at least one flooding station and/or the first upper flooding half to have a flooding unit for applying at least one second cover layer made of a second plastic material, in particular to at least one partial area of the surface of the at least one base body, preferably by means of flooding and/or partial flooding.

In addition to the at least one injection-molding station and the at least one flooding station, the device further preferably has one or more of the following work stations:

At least one work station, in particular at least one further injection-molding station, for applying the at least one first and/or second cover layer made of a second plastic material, in particular by means of injection molding, flooding and/or partial overspraying. The at least one further injection-molding station here preferably has in each case a closing device for forming the second injection-molding cavity and/or a further injection-molding cavity by means of one or more upper and/or lower second and/or third mold halves, in particular by sealing the one or more upper and/or lower second and/or third mold halves against the at least one base body, the one or more insert elements and/or the first upper and/or lower mold half. Further, for this, the at least one further injection-molding station preferably has an injection unit for introducing the first, second and/or third plastic material into the second injection-molding cavity. In this respect, reference is made to the above statements.

Further, it is possible for the device to have at least one pretreating station for pretreating at least one partial area of the surface of the at least one base body, in particular using one or more processing methods selected from: treatment with gas, flame treatment, plasma treatment, fluorination, irradiation, cleaning, surface activation, coating and/or combinations of these.

It is also possible for the device to have at least one checking station for optically checking at least one partial area of the surface of the at least one base body, the one or more insert elements and/or the component by means of an optical sensor, in particular by means of a camera. The check can here be effected, as already stated above, in particular by means of optical sensors, in particular a camera.

Further, it is also possible for the device to have at least one cleaning station, in particular for cleaning at least one partial area of the surface of the at least one base body and/or the component by means of brushes and/or compressed air and/or suction. In this respect as well, reference is made to the above statements regarding the cleaning step.

The device preferably has a demolding station for removing the at least one base body and/or the component comprising the at least one base body from the mold. Further, it is possible for the demolding station for removing the component comprising the at least one base body, the one or more insert elements, as well as optionally the one or more further insert elements and/or the at least one first and/or second cover layer, in particular from the first upper and/or lower mold half. In the demolding station, a corresponding cooling and curing of the component can further also be carried out before removal from the mold.

It is possible for the device to have a quantity of n work stations, in particular one or more injection-molding stations, one or more flooding stations, one or more pretreating stations, one or more checking stations, one or more cleaning stations and one or more demolding stations, and for preferably in each case at least n upper and/or lower mold modules, in particular comprising upper and/or lower mold halves and/or upper and/or lower flooding halves, to be arranged on the at least one upper mold carrier and/or on the at least one lower mold carrier. If the device thus has for example an injection-molding station, a stamping station, a further injection-molding station and a demolding station, for example at least four upper or lower mold halves are provided on the common upper or lower mold carrier and four lower or upper mold halves are provided on the lower or upper mold carrier. The four processing steps which are carried out by these four work stations, which can be combined from the four upper and the four lower mold halves, can thus be carried out in each case in parallel, whereby the efficiency is correspondingly improved, in particular is improved by a factor of four.

Further, it is possible for the device to have one or more work stations and/or one or more combinations of one or more work stations, preferably selected from: printing station, in particular a printing station for inkjet printing and/or pad printing, labeling station, in particular labeling station for sticking on labels, laser-marking station, in particular a laser-marking station for ablation, or for material removal, and/or for blackening and/or for color change, preferably of laser-sensitive layers, cold-stamping station, hot-stamping station, preferably wherein these work stations, preferably for printing, labeling, lasering, cold stamping and/or hot stamping, are arranged before and/or after the removal of the component and/or the at least one base body and/or the component comprising the at least one base body from the mold, in particular before and/or after step d), preferably before and/or after the demolding station, and/or before and/or after the flooding, in particular before and/or after step e), preferably before and/or after the flooding station.

The device preferably has at least one adjusting device for moving the at least two upper mold modules of the at least one upper mold carrier and/or the at least one lower mold module of the at least one lower mold carrier, in particular between the work stations of the device. This adjusting device can here be provided by a corresponding servo drive and/or a hydraulic drive and/or a pneumatic drive. This adjusting device is preferably actuated by a process-control device, which moves the at least one upper and/or lower mold half cyclically in a predefined sequence between the two or more work stations of the device and supplies them to the respective work stations for the processing.

Further, it is possible for the device to have a process-control device, which actuates the adjusting device such that the at least two upper mold modules of the at least one upper mold carrier and/or that the at least one lower mold module of the at least one lower mold carrier are supplied cyclically or anti-cyclically in a predefined sequence to two or more work stations of the device, in particular in a sequence:

injection-molding station-flooding station, injection-molding station-flooding station-demolding station, injection-molding station-pretreating station-flooding station-demolding station, injection-molding station-flooding station-further injection-molding station-demolding station, injection-molding station-pretreating station-flooding station-further injection-molding station-demolding station, injection-molding station-pretreating station-flooding station-further injection-molding station-cleaning station-demolding station, injection-molding station-pretreating station-flooding station-further injection-molding station-further pretreating station-further flooding station-cleaning station-demolding station, injection-molding station-pretreating station-flooding station-further injection-molding station-further pretreating station-further flooding station-cleaning station-checking station-demolding station.

BRIEF DESCRIPTION OF THE DRAWINGS

In the following the invention is explained with reference to several embodiment examples utilizing the attached drawings by way of example.

DETAILED DESCRIPTION

Figure 1:
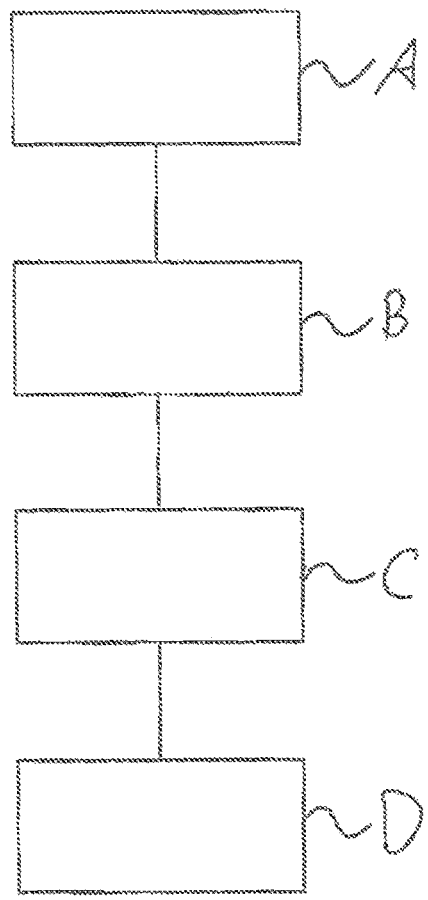
FIG. 1 shows a schematic representation of a method.

FIG. 1 shows a method for producing a component 1, wherein in the method the following steps are carried out, in particular in the following sequence:

A providing at least one upper mold carrier 2a and at least one lower mold carrier 2b, wherein the at least one upper mold carrier 2a has at least two upper mold modules 20a and the at least one lower mold carrier 2b has at least one lower mold module 20b, B moving the at least one upper mold carrier 2a and/or the at least one lower mold carrier 2b in at least one direction into at least one predetermined position, C combining a first upper mold module 20aa of the at least two upper mold modules 20a of the at least one upper mold carrier 2a and a first lower mold module 20ba of the at least one first lower mold module 20b of the at least one lower mold carrier 2b in the at least one predetermined position such that one or more work stations 3 for carrying out at least one step for producing the component 1 are formed, D carrying out the at least one production step to form the component 1.

It is possible for the first upper mold module 20aa of the at least two upper mold modules 20a of the at least one upper mold carrier 2a and the at least one first lower mold module 20ba of the at least one lower mold module 20b of the at least one lower mold carrier 2b to be combined in the at least one predetermined position such that one or more work stations of the one or more work stations 3 are formed as an injection-molding station 3a comprising an injection mold 3aa, wherein the injection mold 3aa has the first upper mold module 20aa and the first lower mold module 20ba, in particular wherein the first upper mold module 20aa has a first upper mold half 200aa, preferably with at least one first upper mold cavity 2000aa, and/or the first lower mold module 20ba has a first lower mold half 200ba with at least one first lower mold cavity 2000ba.

Further, it is possible for the method to comprise one or more steps of the following steps, in particular in the following sequence:

a closing the injection mold 3aa comprising the first upper mold half 200aa, preferably with the at least one first upper mold cavity 2000aa, and the first lower mold half 200ba with the at least one first lower mold cavity 2000ba, wherein at least one first injection-molding cavity 2000 defined by the first upper mold cavity 2000aa and the first lower mold cavity 2000ba is formed, b injection molding at least one base body 4 by introducing a first plastic material 4a into the at least one first injection-molding cavity 2000, c opening the injection mold 3*aa*, wherein the at least one base body 4 remains following the contours in the at least one first lower or first upper mold cavity 2000*aa*, 2000*ba* and only at least one first partial area of one or more surfaces of the at least one base body 4 is exposed, wherein, however, at least one second partial area of the surface of the base body 4 still remains in the first upper and/or lower mold cavity 2000*aa*, 2000*ba*, d removing the component 1, in particular comprising the at least one base body 4, from the first upper and/or lower mold cavity 2000*aa*, 2000*ba* or mold half 200*aa*, 200*ba*.

Further, it is also possible for the following further step to be carried out one or more times before step a and/or d:

a1 inserting one or more insert elements 5 in the at least one first injection-molding cavity 2000 and/or on at least one exposed first partial area of the at least one exposed first partial area of the surface of the at least one base body 4, wherein the at least one base body 4 remains following the contours in the at least one first upper or first lower mold cavity 2000*aa*, 2000*ba* of the first upper or first lower mold half 200*aa*, 200*ba*.

The base body 4 preferably comprises one or more or all insert elements of the one or more insert elements 5 in step d, in particular wherein one or more insert elements of the one or more insert elements 5 are formed as film elements, preferably of a film, as decorative elements and/or as functional elements.

In particular, it is possible for the following further step to be carried out one or more times after step d, in particular between steps a and b and/or b and c:

e applying at least one first cover layer 6 made of a second plastic material 6*a*, in particular by means of injection molding and/or flooding and/or partial overspraying, to at least one partial area of the surface of the at least one base body 4.

In particular, when step e is carried out the at least one base body 4 remains following the contours in the first upper or first lower mold cavity 2000*aa*, 2000*ba* of the first upper or first lower mold half 200*aa*, 200*ba*.

When step e is carried out, it is possible for at least one second injection-molding cavity to be formed by means of one or more further upper mold halves of the at least two upper mold modules 20*a* of the at least one upper mold carrier 2*a* and/or one or more further lower mold halves of the at least one lower mold module 20*b* of the at least one lower mold carrier 2*b*, in particular by sealing the one or more further upper and/or lower further mold halves against the base body 4, the one or more insert elements 5 and/or the first upper and/or lower further mold half, and for the second plastic material 6*a* to be introduced into the at least one second injection-molding cavity 2001.

Further, it is possible for the following step to be carried out one or more times between steps b, c and/or d and/or between steps d and e or d:

pretreating at least one exposed first partial area of the at least one exposed first partial area of the surface of the at least one base body 4, in particular using one or more processing methods and/or combinations of one or more processing methods selected from: treatment with gas, flame treatment, plasma treatment, fluorination, irradiation, cleaning, surface activation, coating.

It is also possible for at least one optical check of at least one partial area of the surface of the at least one base body 4, of the one or more insert elements 5, and/or the component 1 to be effected by means of one optical sensor or several optical sensors, in particular one or more cameras, between steps c, d and/or e.

Further, it is also possible for the following step to be carried out after step c or d and/or between steps d and e and/or after step e:

cleaning, in particular by means of brushes and/or compressed air and/or suction.

In particular, one or more insert elements of the one or more insert elements 5 are used in step a1 as a transfer film, in particular a cold-stamping film, comprising a carrier ply and a transfer ply detachable therefrom, an adhesive layer is applied, in particular by means of an inkjet printhead, to the transfer ply and/or to at least one partial area of the surface of the at least one base body 4 in at least one first area, but is not applied in at least one second area, the transfer film is guided by means of the stamping tool towards the one or more surfaces of the at least one base body 4, the adhesive layer is activated and the transfer film is peeled off again, with the result that a section of the transfer ply defined by the shape of the first area are applied as the one or more insert elements 5.

Before step a one or more further insert elements 5 are preferably introduced into the at least one first injection-molding cavity 2000, in particular are inserted in the first upper and/or first lower mold half 200*aa*, 200*ba*, and in step b are back-injection molded and/or insert-molded with the first plastic material 4*a*.

When step a1 is carried out, it is possible for one or more insert elements of the one or more insert elements 5 to be inserted register-accurate relative to one or more further insert elements of the one or more further insert elements, in particular wherein one or more register marks or optical features of the one or more further insert elements and/or of the first upper and/or first lower mold cavities 2000*aa*, 2000*ba* or mold halves 200*aa*, 200*ba* are detected and are used to control the insertion.

Further, it is possible for the one or more insert elements 5 and/or the one or more further insert elements in each case to have at least one decorative layer, at least one functional layer, in particular a layer with an electrical functionality, in particular comprising one or more elements selected from touch sensor, antenna, capacitor, coil, electromagnetic shielding, electrically non-conductive, metallic layers, in particular for preventing electrostatic charge, display, LED, electric circuit, solar cell, at least one, in particular post-curable, protective layer and/or at least one adhesion-promoting layer or adhesion-promoter layer.

The first upper and/or first lower mold half 200*aa*, 200*ba* is preferably rotated and/or shifted and/or moved between steps a1 and b, steps a and b and/or steps d and e being carried out.

Further, it is possible for a second upper mold module 20*ab* of the at least two upper mold modules 20*a* of the at least one upper mold carrier 2*a* and the first lower mold module 20*ba* of the at least one lower mold module 20*b* of the at least one second mold carrier 2*b* to be combined in the at least one predetermined position such that one or more work stations of the one or more work stations 3 are formed as a flooding station 3*b* comprising the second upper mold module 2*ab* and the first lower mold module 2*ba*, in particular wherein the second upper mold module 20*ab* is a second upper mold half 200*ab* with a first upper flooding half 2000*ab* and/or the first lower mold module 20*ba* is the first and/or second mold half 200*ba* with the first and/or second mold cavity 2000*ba*.

It is also possible for the following step to be carried out between steps d and e and/or after step e:
    f applying at least one second cover layer 6 to at least one partial area of the surface of the at least one base body 4.

Further, it is also possible for the at least one second cover layer 7 to be applied by means of the flooding station 3b in step f such that one or more insert elements of the one or more insert elements 5 are at least partially encased between the at least one base body 4 and the at least one second cover layer 7.

In particular, the at least one second cover layer 7 is applied by means of the flooding station 3b in step f such that the at least one second cover layer 7 overlaps the one or more insert elements 5 and/or the at least one first partial area of the surface of the base body 4 only over part of the surface or completely.

Further, it is also possible, before and/or during and/or after the application of the at least one second cover layer 7 in step c, in particular by means of the flooding station 3b, for the at least one second cover layer 7 to be modified and/or structured, preferably by inserting/placing particles on at least one partial area of the surface of the at least one base body 4 and/or after step b and/or through the use of mold structures during the application in step f and/or by subsequent lasering, overprinting and/or overstamping of the at least one second cover layer 7.

The at least one second cover layer 7 preferably consists of a third plastic material 7a.

It is possible for the first and/or second and/or third plastic material 4a, 6a, 7a to consist of a thermoplastic material, of a plastic material that cures by crosslinking, in particular a 2C material and/or two-component material, and/or of a thermally curable and/or radiation-curable material, and/or of a mixture of such plastic materials and/or wherein for the first and/or second and/or third plastic material 4a, 6a, 7a to be completely or partially cured, in particular by irradiation.

Further, it is possible for the first and/or second and/or third plastic material 4a, 6a, 7a to consist of polyurethane or polyurea and the first and/or second and/or third plastic material 4a, 6a, 7a to consist of a thermoplastic, in particular of ABS, ASA, ABS-PC, PC-PBT and/or ASA-PC and/or for the composition of the first and/or second and/or third plastic material 4a, 6a, 7a to be selected from the group consisting of polyurethane-containing dispersions, polyurethane-containing resins, polyurethane solutions, compositions comprising polyurethane precursors, 2C PUR systems, and mixtures thereof.

Step e is preferably carried out multiple times with different first and/or second and/or third plastic materials 4a, 6a, 7a and/or different further upper and/or lower mold halves.

Figure 2:
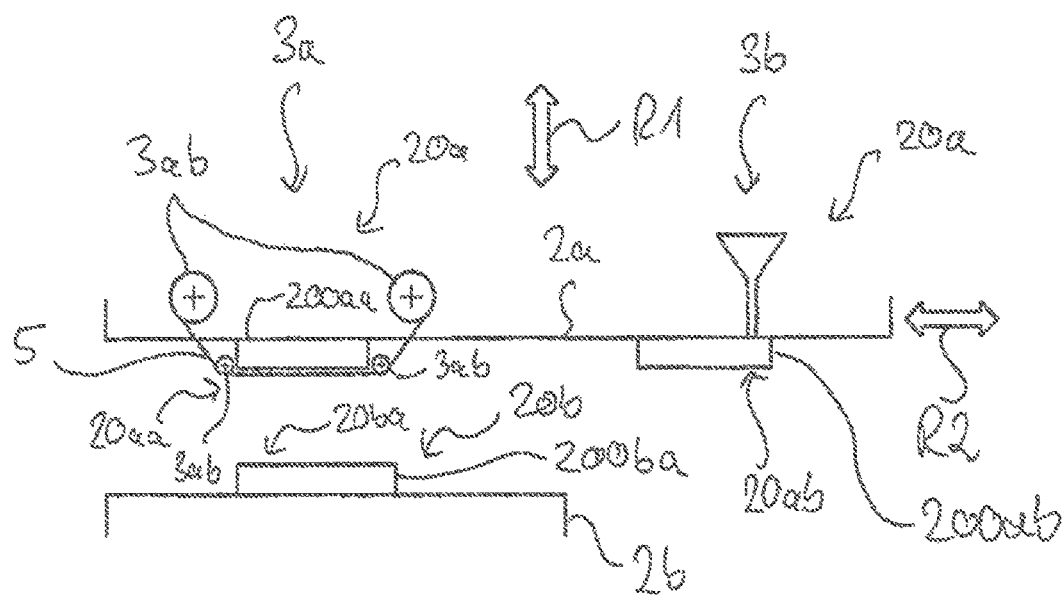
FIG. 2 shows a schematic representation of a device.

FIG. 2 shows a device 10 for producing a component 1, in particular for carrying out an above-described method or one or more of method steps A, B, C, D, a1, a, b, c, d, e and/or f,
    wherein the device has an upper mold carrier 2a and a lower mold carrier 2b, wherein the upper mold carrier 2a has two upper mold modules 20a and the lower mold carrier 2b has one lower mold module 20b, wherein the upper mold carrier 2a can be moved in a first direction or respective opposite direction R1 and/or in a second direction or respective opposite direction R2 into at least one predetermined position, in particular wherein the lower mold carrier 2b cannot be moved, and wherein a first upper mold module 20aa of the two upper mold modules 20a of the upper mold carrier 2a and a first lower mold module 20ba of the one lower mold module 20b of the lower mold carrier 2b can be combined in the at least one predetermined position such that two work stations 3a, 3b, in particular for carrying out at least one step for producing the component 1, are formed.

In particular, the first direction or respective opposite direction R1 and the second direction or respective opposite direction R2 here are arranged perpendicular to each other.

Further, FIG. 2 also shows that the injection-molding station 3a has an insertion unit 3ab, wherein the insertion unit 3ab is for inserting and/or feeding one or more insert elements 5 into the first upper mold half 200aa.

Further, the upper mold carrier 2a having the two upper mold modules 20a can be moved in each case in the directions R1 and/or R2 into at least one predetermined position.

It is possible for the at least one upper mold carrier 2a having the at least two upper mold modules 20a and/or for the at least one lower mold carrier 2b having the lower mold module 20b to be arranged along a predetermined preferred direction and/or in a predetermined preferred plane, in particular wherein the upper mold carrier 2a is formed as a preferably vertically or horizontally arranged rotary plate or sliding table.

Further, it is possible for at least one upper mold module of the two upper mold modules 20a of the upper mold carrier 2a and/or for the lower mold module of the lower mold module 20b of the lower mold carrier 2b to be selected from: mold half, in particular mold half comprising a mold cavity, preferably a first mold half with a first mold cavity or a second mold half with a second mold cavity.

It is also possible for one or both work stations of the two work stations 3a, 3b to be selected and/or combined from: injection-molding station, flooding station, pretreating station, first further flooding station, further injection-molding station, second further flooding station, cleaning station, demolding station.

FIG. 2 further shows that a first work station of the two work stations 3 is formed as an injection-molding station 3a comprising a first upper mold module 20aa of the two upper mold modules 20a of the upper mold carrier 2a and a first lower mold module 20ba of the lower mold module 20b of the lower mold carrier 2b.

Further, FIG. 2 also shows that a second work station of the two work stations 3 is formed as a flooding station 3b comprising a second upper mold module 20ab of the two upper mold modules 20a of the upper mold carrier 2a and the first lower mold module 2ba of the lower mold module 20b of the lower mold carrier 2b, in particular wherein the second upper mold module 20ab is a second upper mold half 200ab and/or the first lower mold module 20ba is the first lower mold half 200ba.

It is possible here for the flooding station 3b and/or the second upper mold half 200ab to be or comprise a casting mold or a 2C mold.

Further, it is possible for the flooding station 3b and/or the second upper mold half 200ab to have a flooding unit 3ba for applying at least one second cover layer 7 made of a second plastic material 7a, in particular to at least one partial area of the surface of at least one base body 4, preferably by means of flooding and/or partial flooding.

Figure 3:
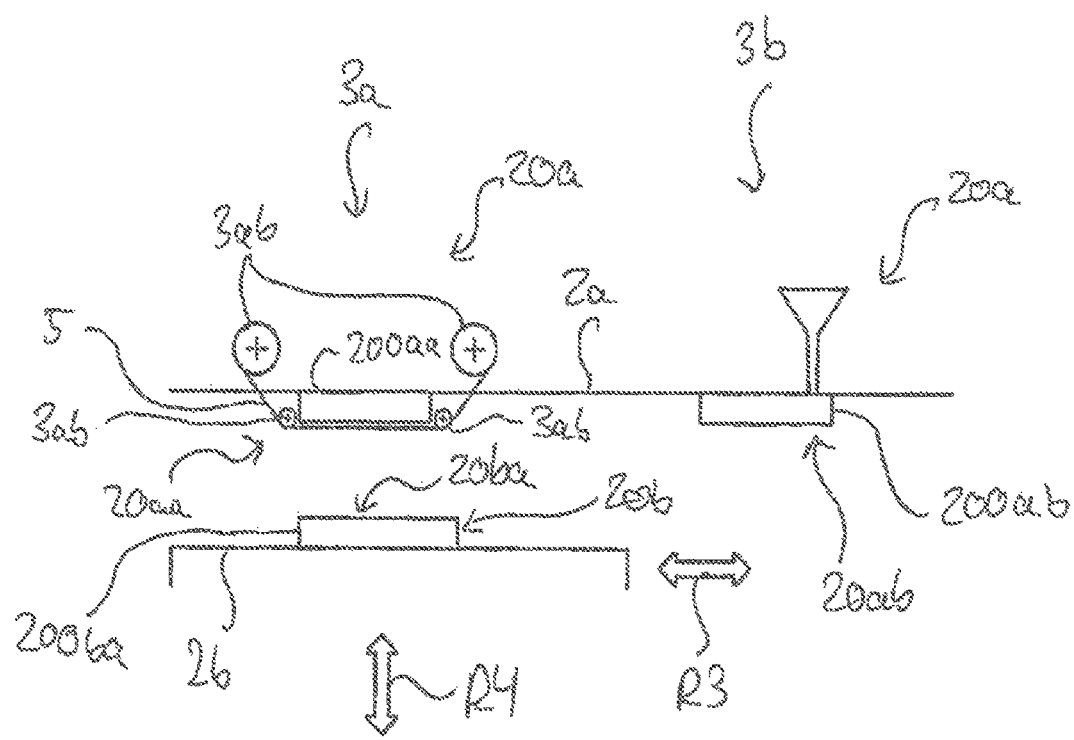
FIG. 3 shows a schematic representation of a device.

FIG. 3 shows the device 10 shown in FIG. 2, except that the upper mold carrier 2a cannot be moved and the lower mold carrier 2b can be moved in a third direction or respective opposite direction R3 and/or in a fourth direction or respective opposite direction R4 into at least one predetermined position.

In particular, the third direction or respective opposite direction R3 and the fourth direction or respective opposite direction R4 here are arranged perpendicular to each other. In the example shown here, the third direction or respective opposite direction R3 can also be a rotational movement about an axis of rotation parallel to the direction R4.

It is also possible that the first mold carrier and the second mold carrier in each case can be moved in one or more of the directions R1, R2, R3 and/or R4 and/or can be rotated along the axes which are spanned by these directions.

Figure 4:
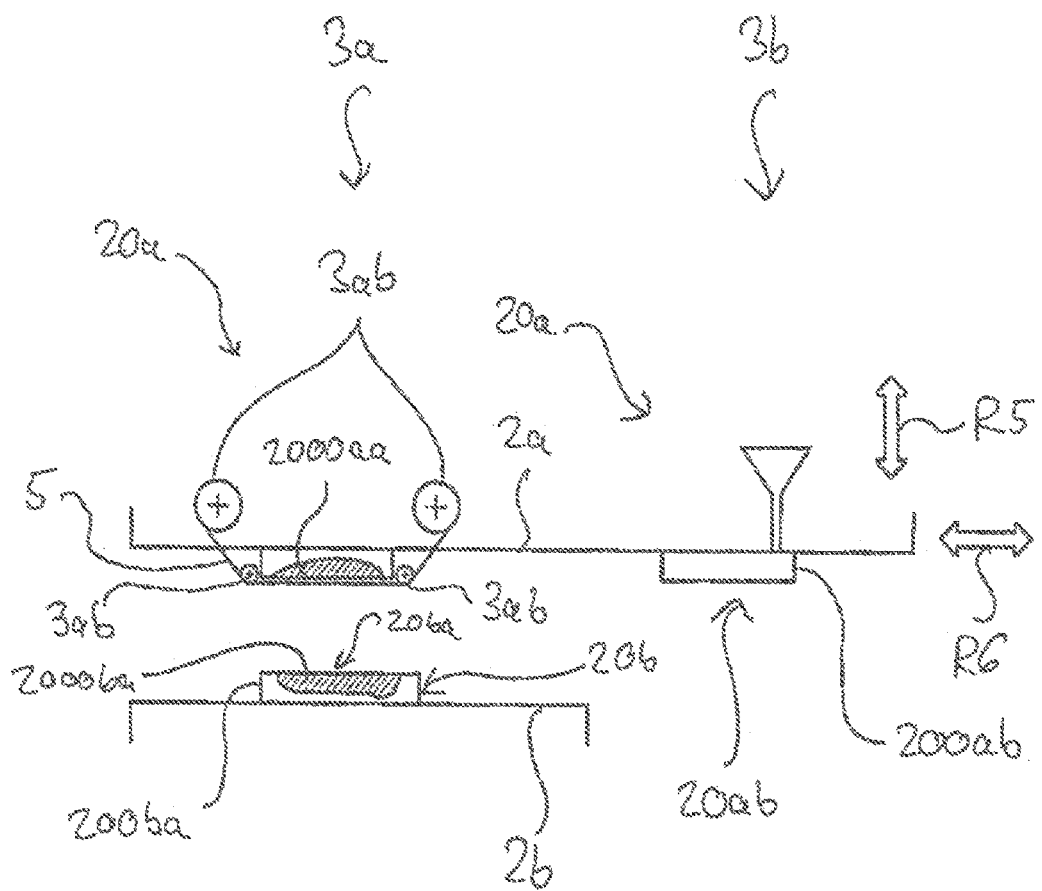
FIG. 4 shows a schematic representation of a device.

FIG. 4 shows the device 10 shown in FIG. 2, except that the upper mold carrier 2a can be moved in a fifth direction or respective opposite direction R5 and/or in a sixth direction or respective opposite direction R6 and the lower mold carrier 2b cannot be moved into at least one predetermined position.

In particular, the fifth direction or respective opposite direction R5 and the sixth direction or respective opposite direction R6 here are arranged perpendicular to each other.

Further, FIG. 4 shows that the first upper mold module 20aa is a first upper mold half 200aa with a first upper mold cavity 2000aa and the first lower mold module 20ba is a second lower mold half 200ba with a second lower mold cavity 2000ba.

Further, FIG. 4 also shows that the injection-molding station 3a has an insertion unit 3ab, wherein the insertion unit 3ab is for inserting and/or feeding one or more insert elements 5 into the first upper mold cavity 2000aa of the first upper mold half 200aa.

It is possible for the at least one injection-molding station 3a to have a closing device 3ac for closing an injection mold 3aa, in particular comprising the first upper mold half 200aa with the first upper mold cavity 2000aa and the first lower mold half 200ba with the first lower mold cavity 2000ba, forming at least one first injection-molding cavity 2000, and for opening the injection mold 3aa.

Figure 5:
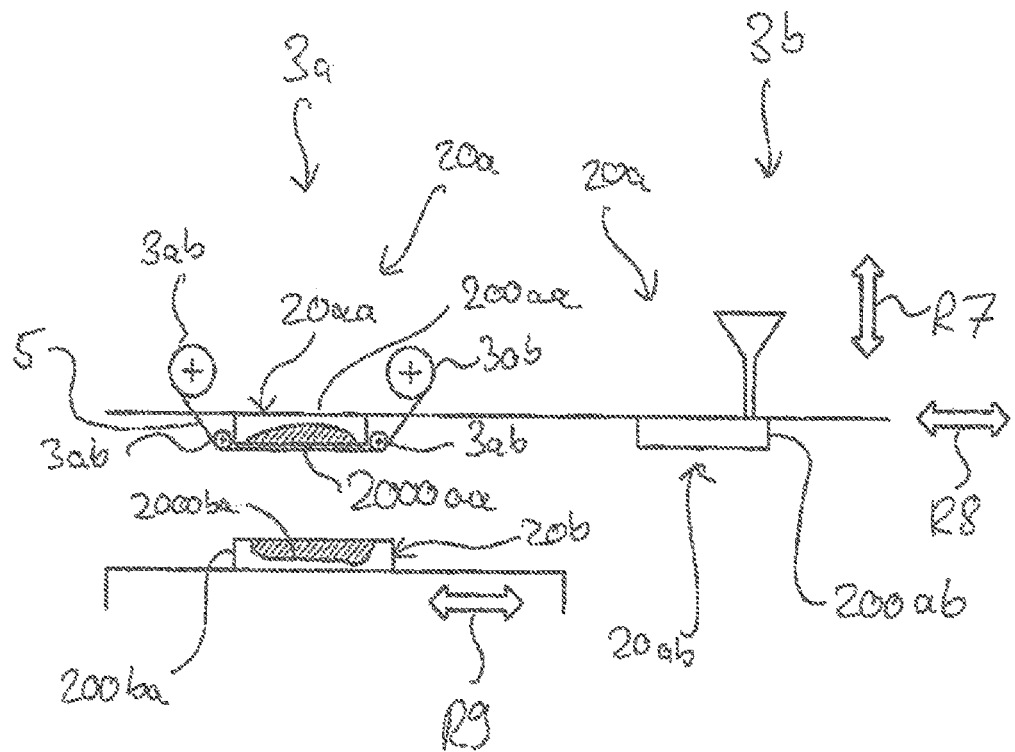
FIG. 5 shows a schematic representation of a device.

FIG. 5 shows the device 10 shown in FIG. 4, except that the upper mold carrier 2a can be moved in a seventh direction or respective opposite direction R7 and/or in an eighth direction or respective opposite direction R8 and the lower mold carrier 2b can be moved in a ninth direction or respective opposite direction R9 into at least one predetermined position. In the example shown here, the ninth direction or respective opposite direction R9 can also be a rotational movement about an axis of rotation parallel to the direction R7.

In particular, the seventh direction or respective opposite direction R7 and the eighth direction or respective opposite direction R8 here are arranged perpendicular to each other and the seventh and eighth directions or respective opposite directions R7 and R8 are arranged perpendicular and parallel to the ninth direction or respective opposite direction R9, respectively.

Figure 6:
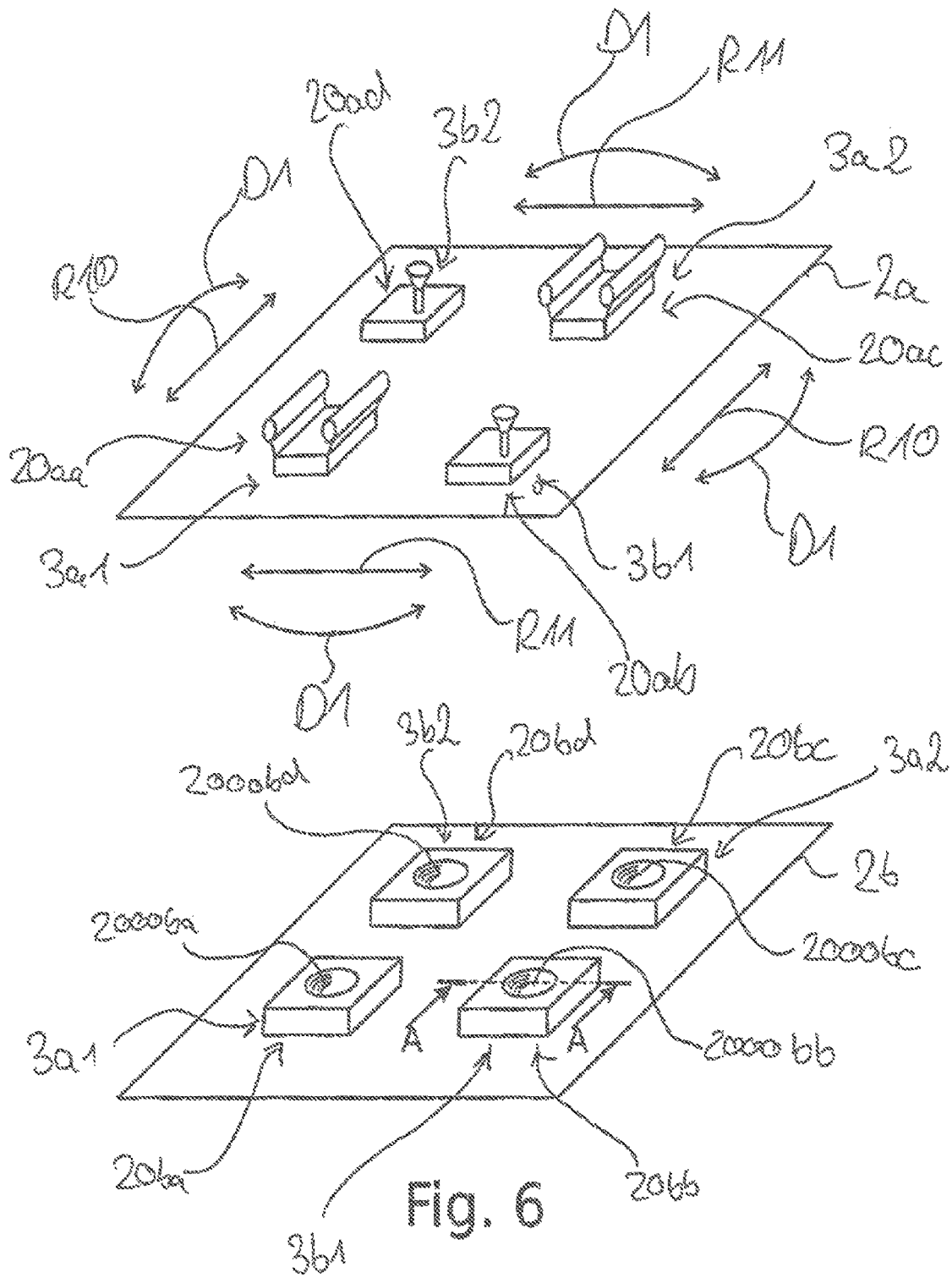
FIG. 6 shows a schematic representation of a device.

FIG. 6 shows a device 10 comprising an upper mold half 2a and a lower mold half 2b, which have in particular a rectangular, preferably square, further preferably circular, base area. Further, the upper mold carrier 2a has four upper mold modules 20aa, 20ab, 20ac, 20ad. The lower mold carrier 2b has four lower mold modules 20ba, 20bb, 20bc, 20bd.

Here, the upper mold carrier 2a can be moved and/or shifted along a tenth direction or respective opposite direction R10 and/or an eleventh direction or respective opposite direction R11 and can be moved or rotated along a first direction of rotation or respective opposite direction of rotation D1.

In particular, the tenth direction or respective opposite direction R8 and the eleventh direction or respective opposite direction R11 here are arranged perpendicular to each other. The axis of rotation, which defines the first direction of rotation or respective opposite direction of rotation D1, preferably stands perpendicularly on the plane spanned by the upper and/or lower mold carrier 2a, 2b.

In the, in particular spatial, arrangement shown of the upper mold carrier 2a comprising the four upper mold modules 20aa, 20ab, 20ac, 20ad and the lower mold carrier 2b comprising the four lower mold modules 20ba, 20bb, 20bc, 20bd, the device 10 shown in FIG. 6 has four work stations. Here, the first work station as a first injection-molding station 3a1 is a combination of the first upper mold module 20aa and the first lower mold module 20ba, the second work station as a first flooding station 3b1 is a combination of the second upper mold module 20ab and the second lower mold module 20bb, the third work station as a second injection-molding station 3a2 is a combination of the third upper mold module 20ac and the third lower mold module 20bc, and the fourth work station as a second flooding station 3b2 is a combination of the fourth upper mold module 20ad and the fourth lower mold module 20bd.

The four lower mold modules 20ba, 20bb, 20bc, 20bd in each case have a mold cavity 2000ba, 2000bb, 2000bc, 2000bd.

When the upper mold carrier is rotated by 90° about the axis of rotation, in particular along the first direction of rotation or respective opposite direction of rotation D1, a further combination of four work stations results. After four rotations of the upper mold carrier by 90° about the axis of rotation, in particular along the first direction of rotation or respective opposite direction of rotation D1, thus by 360°, the above-described, initial combination of the four work stations comprising the first injection-molding station 3a1, the first flooding station 3b1, the second injection-molding station 3a2 and the second flooding station 3b2 results.

Alternatively or additionally, it is also possible that the lower mold carrier can be rotated and/or shifted about the same axis of rotation and/or further axes of rotation as the upper mold carrier.

Such a device 10 advantageously makes it possible for four processing steps to be carried out in each case in parallel, in particular along a cycle comprising four 90°-rotations along the axis of rotation, in particular along the first direction of rotation or respective opposite direction of rotation D1, which steps are carried out by these four work stations which can be combined from the four upper mold modules 20aa, 20ab, 20ac, 20ad and the four lower mold modules 20ba, 20bb, 20bc, 20bd, whereby the efficiency is correspondingly improved, in particular is improved by a factor of four.

Alternatively, it is possible for two of the upper mold modules 20aa, 20ab or 20ac and 20ad not to be present, with the result that two of the lower mold modules 20ba and 20bb or 20bc and 20bd are always free. These free lower mold modules and base bodies optionally located therein can undergo further processing steps, while injection-molding processes and flooding processes are taking place in the other two work stations. For example, checking processes and/or cleaning processes and/or pretreating processes and/or printing processes and/or laser-marking processes, which preferably synchronize with the timings or injection-molding processes and flooding processes or run for less time, can take place on the free mold modules on the base bodies optionally located therein.

Further, it is possible for the injection-molding stations 3a1, 3a2 in each case to have an injection unit 3ad for introducing first plastic material 4a forming at least one base body 4 into at least one first injection-molding cavity 2000 and/or to be for applying at least one first cover layer 6 to at least one partial area of the surface of the at least one base body 4, in particular wherein the at least one first cover layer 6 consists of a second plastic material 6a, wherein the at least one base body 4 comprises one or more or all insert elements of the one or more insert elements 5.

Further, it is possible for the at least one base body 4 to be arranged following the contours in the lower mold cavity 2000ba, 2000bb, 2000bc, 2000bd, in particular of the lower mold halves 200ba, 200bb, 200bc, 200bd, of the lower mold modules 20ba, 20bb, 20bc, 20bd of the lower mold carrier 2b, and/or the at least one first injection-molding cavity 2000.

It is also possible for the flooding stations 3b1, 3b2 shown in FIG. 6 to comprise a casting mold or a 2C mold.

Further, it is possible for the flooding stations 3b1, 3b2 and/or the upper mold halves 20a, 20ad in each case to have a flooding unit 3ba for applying at least one second cover layer 7 made of a second plastic material 7a, in particular to at least one partial area of the surface of the at least one base body 4, preferably by means of flooding and/or partial flooding.

Figure 7:
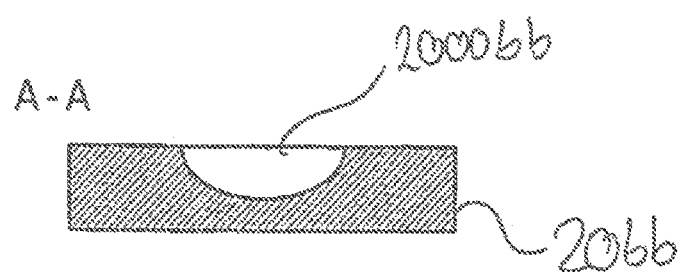
FIG. 7 shows a schematic representation of a mold module in cross section.

FIG. 7 shows, for example, the mold module 20bb shown in FIG. 6 in a cross section along the line A-A shown in FIG. 6 and in particular perpendicular to the plane spanned by the base area of the lower mold carrier 2b, wherein the mold module 20bb has a mold cavity 2000bb.

It has proved to be advantageous if the device 10 has one or more of the following work stations:
- pretreating station 3c for pretreating at least one partial area of the surface of the at least one base body 4, in particular using one or more processing methods selected from: treatment with gas, flame treatment, plasma treatment, fluorination, irradiation, cleaning, surface activation, coating and/or combinations of these
- checking station 3d for optically checking at least one partial area of the surface of the at least one base body 4, the one or more insert elements 5 and/or the component 1 by means of an optical sensor, in particular by means of a camera
- cleaning station 3e, in particular for cleaning at least one partial area of the surface of the at least one base body 4 and/or the component 1 by means of brushes and/or compressed air and/or suction
- demolding station 3f for removing the at least one base body 4 and/or the component 1, in particular comprising the at least one base body 4, from the mold
- adjusting device 10a for moving the at least two upper mold modules 20a of the at least one upper mold carrier 2a and/or the at least one lower mold module 20b of the at least one lower mold carrier 2b, in particular between the work stations 3 of the device
- printing station, in particular printing station for inkjet printing and/or pad printing
- labeling station, in particular labeling station for sticking on labels
- laser-marking station, in particular laser-marking station for ablation and/or for blackening and/or for color change, preferably of laser-sensitive layers and/or areas of the base body and/or the component
- cold-stamping station
- hot-stamping station Further, it is possible for the device 10 to have one or more work stations and/or one or more combinations of one or more work stations, preferably selected from: printing station, in particular a printing station for inkjet printing and/or pad printing, labeling station, in particular labeling station for sticking on labels, laser-marking station, in particular a laser-marking station for ablation and/or for blackening and/or for color change, preferably of laser-sensitive layers and/or areas of the base body, cold-stamping station, hot-stamping station, preferably wherein these work stations, preferably for printing, labeling, lasering, cold stamping and/or hot stamping, are arranged before and/or after the removal of the component and/or the at least one base body and/or the component comprising the at least one base body from the mold on, in particular before and/or after step d), preferably before and/or after the demolding station, and/or before and/or after the flooding, in particular before and/or after step e), preferably before and/or after the flooding station.

Further, it is possible for one or more insert elements of the one or more insert elements to be used in step a1) as a transfer film, in particular a hot-stamping film, preferably comprising a carrier ply and/or a transfer ply detachable therefrom with an adhesive layer, in particular wherein the transfer film is pressed against the one or more surfaces of the at least one base body by means of a heated stamping tool, in particular wherein the adhesive layer and the detachment layer of the transfer film are activated and in particular wherein the transfer film is then peeled off the transfer ply adhering to the base body, in particular wherein a section of the transfer ply defined by the shape of the stamping tool are hereby applied as the one or more insert elements.

Further, it is also possible for one or more steps of the following further steps and/or for at least one combination of one or more steps of the following one or more steps to be carried out, in particular selected from: printing, in particular inkjet printing and/or pad printing, labeling, in particular sticking on labels, introducing and/or applying laser markings, lasering, in particular ablation, or material removal, and/or blackening and/or color change, preferably of laser-sensitive layers or areas of the component and/or the base body, cold stamping, hot stamping, thermal transfer, preferably wherein these steps are arranged in particular before and/or after the removal of the component and/or the at least one base body and/or the component comprising the at least one base body from the mold on, preferably before and/or after step d), further preferably before and/or after the demolding station, and/or in particular before and/or after the flooding, preferably before and/or after step e).

Further, it is possible for further steps to be effected after removing or after the removal of the component and/or the at least one base body and/or the component comprising the at least one base body from the mold, wherein one or more of the further steps are preferably selected from: fitting with functional elements, in particular fitting with printed circuit boards and/or electronic components and/or mechanical components and/or fastening elements, coating, in particular coating with adhesive and/or with further, preferably different, functional layers, mounting and/or installing on and/or in further, in particular different, bodies and/or base bodies, preferably bodies of all types.

It is also possible for the device 10 to have a quantity of n work stations, in particular one or more injection-molding stations 3a, 3a1, 3a2, one or more flooding stations 3b, 3b1, 3b2, one or more pretreating stations 3c, one or more checking stations 3d, one or more cleaning stations 3e and one or more demolding stations 3f, and for preferably in each case at least n upper and/or lower mold modules 20a, 20b, in particular comprising upper and/or lower mold halves and/or upper and/or lower flooding halves, to be arranged on the at least one upper mold carrier 2a and/or on the at least one lower mold carrier 2b.

Further, it is possible for the device 10 to have a process-control device 10b, which actuates the adjusting device 10a such that the at least two upper mold modules 20a of the at least one upper mold carrier 2a and/or that the at least one lower mold module 20b of the at least one lower mold carrier 2b are supplied cyclically or anti-cyclically in a predefined sequence to two or more work stations 3 of the device 10, in particular in a sequence:

injection-molding station 3a-flooding station 3b,
injection-molding station 3a-flooding station 3b-demolding station 3f,
injection-molding station 3a-pretreating station 3c-flooding station 3b-demolding station 3f,
injection-molding station 3a-flooding station 3b-further injection-molding station-demolding station 3f,
injection-molding station 3a-pretreating station 3c-flooding station 3b-further injection-molding station-demolding station 3f,
injection-molding station 3a-pretreating station 3c-flooding station 3b-further injection-molding station-cleaning station 3e-demolding station 3f,
injection-molding station 3a-pretreating station 3c-flooding station 3b-further injection-molding station-further pretreating station-further flooding station-cleaning station 3e-demolding station 3f,
injection-molding station 3a-pretreating station 3c-flooding station 3b-further injection-molding station-further pretreating station-further flooding station-cleaning station 3e-checking station 3d-demolding station 3f.

LIST OF REFERENCE NUMBERS 1 component
10 device
10a adjusting device
10b process-control device
2a upper mold carrier
2b lower mold carrier
20a upper mold module
20b lower mold module
20aa first upper mold module
20ab second upper mold module
20ba first lower mold module
200aa first upper mold half
200ab second upper mold half
200ba first lower mold half
2000 first injection-molding cavity
2001 second injection-molding cavity
2000aa first upper mold cavity
2000ab first upper flooding half
2000ba first lower mold cavity
3 work station
3a injection-molding station
3a1 first injection-molding station
3a2 second injection-molding station
3aa injection mold
3ab insertion unit
3ac closing device
3ad injection unit
3b flooding station
3b1 first flooding station
3b2 second flooding station
3c pretreating station
3d checking station
3e cleaning station
3f demolding station
4 base body
4a first plastic material
5 insert element
6 first cover layer
6a second plastic material
7 second cover layer
7a third plastic material
A method step
B method step
C method step
D method step
a1 method step
a method step
b method step
c method step
d method step
e method step
f method step
R1 direction or respective opposite direction
R2 direction or respective opposite direction
R3 direction or respective opposite direction
R4 direction or respective opposite direction
R5 direction or respective opposite direction
R6 direction or respective opposite direction
R7 direction or respective opposite direction
R8 direction or respective opposite direction
R9 direction or respective opposite direction
R10 direction or respective opposite direction
R11 direction or respective opposite direction
D1 direction of rotation or respective opposite direction of rotation

The invention claimed is:

1. A method for producing a component comprising the following steps:

providing at least one upper mold carrier and at least one lower mold carrier, wherein the at least one upper mold carrier has at least two upper mold modules and the at least one lower mold carrier has at least one lower mold module;

moving the at least one upper mold carrier and/or the at least one lower mold carrier in at least one direction into at least one predetermined position;

combining a first upper mold module of the at least two upper mold modules of the at least one upper mold carrier and a first lower mold module of the at least one first lower mold module of the at least one lower mold carrier in the at least one predetermined position such that one or more work stations for carrying out at least one step for producing the component are formed;

carrying out the at least one production step to form the component, wherein the first upper mold module of the at least two upper mold modules of the at least one upper mold carrier and the at least one first lower mold module of the at least one lower mold module of the at least one lower mold carrier are combined in the at least one predetermined position such that one or more work stations of the one or more work stations are formed as an injection-molding station comprising an injection mold, wherein the injection mold has the first upper mold module and the first lower mold module, wherein the first upper mold module has a first upper mold half with at least one first upper mold cavity, and/or the first lower mold module has a first lower mold half with at least one first lower mold cavity, and wherein the method further comprises the following steps:
- a) closing the injection mold comprising the first upper mold half, with the at least one first upper mold cavity, and the first lower mold half, with the at least one first lower mold cavity, wherein at least one first injection-molding cavity defined by the first upper mold cavity and the first lower mold cavity is formed;
- b) injection molding at least one base body by introducing a first plastic material into the at least one first injection-molding cavity;
- c) opening the injection mold, wherein the at least one base body remains following the contours in the at least one first lower or first upper mold cavity and only at least one first partial area of one or more surfaces of the at least one base body is exposed, wherein at least one second partial area of the surface of the base body still remains in the first upper and/or lower mold cavity;
- d) removing the component, from the first upper and/or lower mold cavity or mold half, and wherein the following further step is carried out one or more times after step d):
- e) applying at least one first cover layer made of a second plastic material to at least one partial area of the surface of the at least one base body, and wherein when step e) is carried out, at least one second injection-molding cavity is formed by means of one or more further upper mold halves of the at least two upper mold modules of the at least one upper mold carrier and/or one or more further lower mold halves of the at least one lower mold module of the at least one lower mold carrier by sealing the one or more further upper and/or lower further mold halves against the base body and/or the first upper and/or lower further mold half, and the second plastic material is introduced into the at least one second injection-molding cavity.

2. The method according to claim 1, wherein the following further step is carried out one or more times
- a1) inserting one or more insert elements in the at least one first injection-molding cavity and/or on at least one exposed first partial area of the at least one exposed first partial area of the surface of the at least one base body, wherein the at least one base body remains following the contours in the at least one first upper or first lower mold cavity of the first upper or first lower mold half.

3. The method according to claim 2, wherein the base body comprises one or more or all insert elements of the one or more insert elements.

4. The method according to claim 1, wherein, when step e) is carried out, the at least one base body remains following the contours in the first upper or first lower mold cavity of the first upper or first lower mold half.

5. The method according to claim 1, wherein the following step is carried out one or more times:
pretreating at least one exposed first partial area of the at least one exposed first partial area of the surface of the at least one base body.

6. The method according to claim 1, wherein the following step is carried out:
cleaning.

7. The method according to claim 2, wherein one or more further insert elements are introduced into the at least one first injection-molding cavity and are back-injection molded and/or insert-molded with the first plastic material.

8. The method according to claim 2, wherein, when step a1) is carried out, one or more insert elements of the one or more insert elements are inserted register-accurate relative to one or more further insert elements of the one or more further insert elements.

9. The method according to claim 1, wherein a second upper mold module of the at least two upper mold modules of the at least one upper mold carrier and the first lower mold module of the at least one lower mold module of the at least one second mold carrier are combined in the at least one predetermined position such that one or more work stations of the one or more work stations are formed as a flooding station comprising the second upper mold module and the first lower mold module.

10. The method according to claim 2, wherein the following step is carried out:
- f) applying at least one second cover layer to at least one partial area of the surface of the at least one base body.

11. The method according to claim 10, wherein the at least one second cover layer is applied by means of a flooding station in step such that one or more insert elements of the one or more insert elements are at least partially encased between the at least one base body and the at least one second cover layer.

12. The method according to claim 10, wherein the at least one second cover layer is applied by means of the flooding station in step f) such that the at least one second cover layer overlaps the one or more insert elements and/or the at least one first partial area of the surface of the base body only over part of the surface or completely.

13. The method according to claim 10, wherein the at least one second cover layer consists of a third plastic material.

14. The method according to claim 13, wherein the first and/or second and/or third plastic material consists of a thermoplastic material, of a plastic material that cures by crosslinking, and/or two-component material, and/or of a thermally curable and/or radiation-curable material, and/or of a mixture of such plastic materials and/or wherein the first and/or second and/or third plastic material is completely or partially cured.

15. The method according to claim 13, wherein the first and/or second and/or third plastic material consists of polyurethane or polyurea and the first and/or second and/or third plastic material consists of a thermoplastic, and/or wherein the composition of the first and/or second and/or third plastic material is selected from the group consisting of polyurethane-containing dispersions, polyurethane-containing resins, polyurethane solutions, compositions comprising polyurethane precursors and mixtures thereof.

16. A method for producing a component comprising the following steps:
providing at least one upper mold carrier and at least one lower mold carrier, wherein the at least one upper mold carrier has at least two upper mold modules and the at least one lower mold carrier has at least one lower mold module;
moving the at least one upper mold carrier and/or the at least one lower mold carrier in at least one direction into at least one predetermined position;
combining a first upper mold module of the at least two upper mold modules of the at least one upper mold carrier and a first lower mold module of the at least one first lower mold module of the at least one lower mold carrier in the at least one predetermined position such that one or more work stations for carrying out at least one step for producing the component are formed;

carrying out the at least one production step to form the component, wherein the first upper mold module of the at least two upper mold modules of the at least one upper mold carrier and the at least one first lower mold module of the at least one lower mold module of the at least one lower mold carrier are combined in the at least one predetermined position such that one or more work stations of the one or more work stations are formed as an injection-molding station comprising an injection mold, wherein the injection mold has the first upper mold module and the first lower mold module, wherein the first upper mold module has a first upper mold half with at least one first upper mold cavity, and/or the first lower mold module has a first lower mold half with at least one first lower mold cavity, and wherein the method further comprises the following steps:
  a) closing the injection mold comprising the first upper mold half, with the at least one first upper mold cavity, and the first lower mold half, with the at least one first lower mold cavity, wherein at least one first injection-molding cavity defined by the first upper mold cavity and the first lower mold cavity is formed;
  b) injection molding at least one base body by introducing a first plastic material into the at least one first injection-molding cavity;
  c) opening the injection mold, wherein the at least one base body remains following the contours in the at least one first lower or first upper mold cavity and only at least one first partial area of one or more surfaces of the at least one base body is exposed, wherein at least one second partial area of the surface of the base body still remains in the first upper and/or lower mold cavity;
  d) removing the component, from the first upper and/or lower mold cavity or mold half, and wherein the following further step is carried out one or more times after step d):
  e) applying at least one first cover layer made of a second plastic material to at least one partial area of the surface of the at least one base body, and wherein the following further step is carried out one or more times before step a) and/or d):
  a1) inserting one or more insert elements in the at least one first injection-molding cavity and/or on at least one exposed first partial area of the at least one exposed first partial area of the surface of the at least one base body, wherein the at least one base body remains following the contours in the at least one first upper or first lower mold cavity of the first upper or first lower mold half.

17. The method according to claim 16, wherein, when step e) is carried out, at least one second injection-molding cavity is formed by means of one or more further upper mold halves of the at least two upper mold modules of the at least one upper mold carrier and/or one or more further lower mold halves of the at least one lower mold module of the at least one lower mold carrier and the second plastic material is introduced into the at least one second injection-molding cavity.

* * * * *